United States Patent
Benitez et al.

(10) Patent No.: US 6,189,141 B1
(45) Date of Patent: Feb. 13, 2001

(54) CONTROL PATH EVALUATING TRACE DESIGNATOR WITH DYNAMICALLY ADJUSTABLE THRESHOLDS FOR ACTIVATION OF TRACING FOR HIGH (HOT) ACTIVITY AND LOW (COLD) ACTIVITY OF FLOW CONTROL

(75) Inventors: Manuel E. Benitez, Cupertino; James S. Mattson, Jr., Campbell; William B. Buzbee, Half Moon Bay; Lacky V. Shah, Sunnyvale, all of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/073,211

(22) Filed: May 4, 1998

(51) Int. Cl.[7] .................................................. G06F 9/44
(52) U.S. Cl. ........................................................ 717/4
(58) Field of Search ..................... 395/701, 702, 395/703, 704, 705, 706, 707, 708, 709, 710, 712; 717/1, 2, 3, 4, 5, 6, 7, 8, 9, 10, 11

(56) References Cited

U.S. PATENT DOCUMENTS

| | | |
|---|---|---|
| 4,071,744 | 1/1978 | Pollock . |
| 4,636,940 * | 1/1987 | Goodwin, Jr. ...................... 395/704 |
| 5,193,180 | 3/1993 | Hastings . |
| 5,335,344 | 8/1994 | Hastings . |
| 5,355,491 | 10/1994 | Lawlor et al. . |
| 5,367,685 | 11/1994 | Gosling . |
| 5,369,766 | 11/1994 | Nakano et al. . |
| 5,381,534 | 1/1995 | Shi . |
| 5,414,855 | 5/1995 | West . |
| 5,442,790 | 8/1995 | Nosenchuk . |
| 5,452,457 | 9/1995 | Alpert et al. . |
| 5,487,158 | 1/1996 | Amelina et al. . |

(List continued on next page.)

OTHER PUBLICATIONS

Bob Cmelik & David Keppel, "Shade: A Fast Instruction-Set Simulator For Execution Profiling", Sigmetrics 94, May 1994, Santa Clara USA 1994, pp. 128–137.

"Daisy: Dynamically Architected Instruction-Set From Yorktown", IBM Corporation, 1996, 2 pages.

"Digital FX!132", Digital Semiconductor, 3 pages.

Matt Pietrek, "Learn System—Level Win32 Coding Techniques By Writing A API Spy Program", Systems Journal, Dec. '94, pp. 17–44.

R. Sites, et al., "Binary Translation", Communications Of The ACM, Feb. '93, vol. 36, No. 2, pp. 69–81.

(List continued on next page.)

Primary Examiner—Tariq R. Hafiz
Assistant Examiner—Todd Ingberg

(57) ABSTRACT

A computer-implemented system, method, and product are provided to designate and translate traces of original instructions of an executable file at run time based on dynamic evaluation of control flow through frequently executed traces of instructions. Such designation typically reduces unnecessary translations and optimizations, and thereby increases execution speed and reduces the usage of memory and other resources. The invention includes a hot trace identifier to identify frequently executed traces of instructions and a hot trace instrumenter to instrument such frequently executed traces so that control flow through them may be recorded. If the amount or rate of control flow through a frequently executed trace exceeds a threshold value, a hot trace selector is invoked to select a hot trace of original instructions including those of the frequently executed trace. The hot trace may be dynamically optimized. The system, method, and product also provide for the continuous recording of control flow through hot traces. If control flow has changed during execution, such that the amount or rate of control flow through a hot trace falls below a threshold value, the trace may be removed.

69 Claims, 13 Drawing Sheets

U.S. PATENT DOCUMENTS

| | | | | |
|---|---|---|---|---|
| 5,504,914 | | 4/1996 | Lai . | |
| 5,519,866 | | 5/1996 | Lawrence et al. . | |
| 5,522,036 | | 5/1996 | Shapiro . | |
| 5,522,072 | | 5/1996 | De Bruler . | |
| 5,535,329 | | 7/1996 | Hastings . | |
| 5,548,794 | | 8/1996 | Yishay et al. . | |
| 5,579,520 | * | 11/1996 | Bennett | 395/704 |
| 5,581,697 | | 12/1996 | Gramlich et al. . | |
| 5,583,988 | | 12/1996 | Crank et al. . | |
| 5,590,331 | | 12/1996 | Lewis et al. . | |
| 5,606,697 | | 2/1997 | Ono . | |
| 5,613,118 | * | 3/1997 | Heisch et al. | 395/709 |
| 5,625,832 | | 4/1997 | Ohsawa et al. . | |
| 5,627,981 | | 5/1997 | Adler et al. . | |
| 5,628,016 | | 5/1997 | Kukol . | |
| 5,652,884 | | 7/1997 | Palevich . | |
| 5,655,121 | | 8/1997 | Delagi et al. . | |
| 5,655,122 | * | 8/1997 | Wu | 395/705 |
| 5,659,752 | * | 8/1997 | Heisch et al. | 395/704 |
| 5,732,210 | | 3/1998 | Buzbee . | |
| 5,752,035 | * | 5/1998 | Trimberger | 395/705 |
| 5,797,013 | * | 8/1998 | Madadevan et al. | 717/9 |
| 5,826,065 | * | 10/1998 | Hinsberg, III et al. | 395/500 |
| 5,828,883 | * | 10/1998 | Hall | 395/704 |
| 5,828,886 | * | 10/1998 | Hayashi | 717/9 |
| 5,838,976 | * | 11/1998 | Summers | 395/704 |
| 5,842,021 | * | 11/1998 | Odani et al. | 395/709 |
| 5,845,126 | * | 12/1998 | Ju et al. | 717/8 |
| 5,850,552 | * | 12/1998 | Odani et al. | 395/709 |
| 5,850,553 | * | 12/1998 | Schlansker et al. | 395/709 |
| 5,854,933 | * | 12/1998 | Chang | 395/709 |
| 5,857,104 | * | 1/1999 | Natarjan et al. | 395/705 |
| 5,878,261 | * | 3/1999 | Holler et al. | 395/709 |
| 5,911,073 | * | 6/1999 | Mattson, Jr. et al. | 395/701 |
| 5,940,618 | * | 8/1999 | Blandy et al. | 717/9 |
| 5,949,995 | * | 9/1999 | Freeman | 712/239 |
| 5,950,009 | * | 9/1999 | Bortnikov et al. | 395/709 |
| 5,960,198 | * | 9/1999 | Roediger et al. | 395/704 |
| 5,963,740 | * | 10/1999 | Srivastava et al. | 395/704 |
| 5,978,588 | * | 11/1999 | Wallace | 395/709 |
| 6,006,033 | * | 12/1999 | Heisch | 395/709 |

OTHER PUBLICATIONS

Eric Traut, "Core Building The Virtual PC", Byte, Nov. '97, pp. 51–52.

Harry J. Saal & Zui Weiss, "A Software High Performance APL Interpreter", IEIE—IEIE, vol. 9, Issue 4, 1979, pp. 74–81.

Ronald L. Johnston, "The Dynamic Incremental Compiler Of APL/3000", IEIE—IEIE, vol. 9, Issue 4, 1979, pp. 82–87.

Kemal Ebcioglu & Erik R. Altman, "DAISY: Dynamic Compilation For 100% Architectural Compatibility", IBM Research Report, RC 20538, Aug. 5, 1996, Computer Science, pp. 1–82.

Reed Hastings & Bob Joyce (Pure Software, Inc.), "Purify: Fast Detection Of Memory Leaks And Access Errors", USENIX—Winter '92, pp. 125–136.

"PA-RISC Instruction Set Archtecture" processor by Hewlett–Packard Company.

Compaq—Digital Products and Services: Technical Support (visited Oct. 29, 1998) <http://www.partner, digital,com/www–swdev/pages/Home/TECH/FX32/fx32.html>.

Sun Microsystems: "Wabi 2: Opening Windows", (visited Oct. 29, 1998) <http//www.sun.com/books/catalog/Fordin/preface.html>.

Sun Microsystems: "Shade and Spixtools", (visited Oct. 29, 1998) °http://sw.sun.com/shade/<.

"HP Announces New PA-8000–Powered HP 3000 979KS Servers", (visited Oct. 29, 1998) <http://www.hp.com/ibp-progs/csy/advisor/nov96/news/pa8000.html>.

"Using and Developing Atom Tools", (visited Oct. 29, 1998) <http://www.unix.digital.com/faqs/p...HTML/AA–PS30D–TET1_html/peg10.html>.

Advanced Compiler Theroy Implementation, Steven S. Muchnick, Aug. 19, 1997 pp. 669–703,705–716,745–746, 753–755,757–765,767–771.*

* cited by examiner

FIG. 6D

222
HOT BLOCK BLOCK-ARC TABLE

| ROW OR RECORD NO. | 222A START INSTRUCTION ADDRESS | 222B JUMP ARC | 222C JUMP ARC COUNTER | 222D JUMP ARC TARGET BLOCK | 222E FALL-THROUGH ARC | 222F FALL-THROUGH ARC COUNT'R | 222G F.-T. ARC TARGET BLOCK |
|---|---|---|---|---|---|---|---|
| 1 | [605-1] | 602 | "500" | [605-6] | 601 | "499" | [605-4] |
| 2 | [605-4] | 603 | "500" | [605-7] | | | |
| 3 | [605-6] | | | | 604 | "500" | [605-7] |
| 4 | [605-7] | | | | | | |

FIGURE 8

| | 212 Hot Block and Hot Trace Look-Up Table | | |
|---|---|---|---|
| Row or Record Number | 212A Original Instruction Address | 212B Hot Block Translated Instruction Address | 212C Hot Trace Translated Instruction Address |
| 1 | [605-1] | [630-1-HB] | [630-1-HT] |
| ----- | ----- | ----- | ----- |

FIGURE 11

| Row or Trace Record No. | 224A Start Instruction Address | 224B Nominal Trace Exit Arc Counter | 224C Alternative Trace Exit Arc Counter |
|---|---|---|---|
| \multicolumn{4}{c}{224 Hot Trace Counter Table} ||||
| 1 | [1010-S] | 23,456 | 19,111 |
| ----- | ----- | ----- | ----- |

CONTROL PATH EVALUATING TRACE DESIGNATOR WITH DYNAMICALLY ADJUSTABLE THRESHOLDS FOR ACTIVATION OF TRACING FOR HIGH (HOT) ACTIVITY AND LOW (COLD) ACTIVITY OF FLOW CONTROL

RELATED APPLICATIONS

The following applications are related to the present application.

U.S. Patent Application entitled "SYSTEM, METHOD, AND PRODUCT FOR JUMP-EVALUATED TRACE DESIGNATION," attorney docket number 10971492-1, naming as inventors Lacky V. Shah, James S. Mattson, Jr., and William B. Buzbee, assigned to the assignee of the present invention and filed concurrently herewith.

U.S. Patent Application entitled "METHOD, APPARATUS, AND PRODUCT FOR DYNAMIC SOFTWARE CODE TRANSLATION SYSTEM," attorney docket number 10980332-1, naming as inventors James S. Mattson, Jr., William B. Buzbee, and Lacky V. Shah, assigned to the assignee of the present invention and filed concurrently herewith.

BACKGROUND OF THE INVENTION

1. Field of the Invention

The invention generally relates to computer systems or computer-implemented systems employing translating or optimizing compilers and methods, and, more particularly, to dynamic translating compilers and methods.

2. Related Art

A variety of techniques are known for static translation of the executable instructions of a computer software program. Such known techniques are implemented by static compilers, i. e., compilers that translate a program prior to execution. One disadvantage of such techniques is that the dynamic behavior of a program typically is more readily and accurately ascertained while it is being executed than while it is being compiled prior to execution.

Some systems and methods exist that avoid this disadvantage by a process generally referred to as dynamic translation. That is, a dynamic compiler operates upon an executable image of the original software program as it is being executed at run time. Typically, the dynamic compiler is thus better able to deduce those paths that execution is most likely to take through particular portions of the program (often referred to as the control flow through the instructions of the program).

Such known dynamic translation systems may be designed to accomplish one or more of a number of tasks. One task is referred to as cross-platform translation, in which a program designed and written for execution on a computer system having a particular architecture and operating system is translated so that the translated program may be executed on another type of computer system. Some existing dynamic translation systems include "Daisy" by International Business Machine Corporation, "fx!32" from Digital Equipment Corporation, and "Wabi" from Sun Microsystems.

Dynamic translation systems are also used for instrumentation and profiling of programs without the need for recompilation. The term "instrumentation" refers generally to the insertion of special code to detect or record various parameters of execution, and "profiling" refers generally to reporting such parameters. Such use may also be referred to as "monitoring." Examples of existing products intended for such uses include "Shade" from Sun Microsystems and "ATOM" from Digital Equipment Corporation.

Such tasks of dynamic translation systems generally are also undertaken by static translation systems, albeit with the noted disadvantage. However, another task traditionally carried out by static translation systems is not adequately carried out by known dynamic translation systems. Such task is optimization; that is, the alteration, deletion, rearrangement, or other revision of instructions, or the addition of new instructions, with the specific objectives of increasing the speed of execution of executable instructions, decreasing the amount of computer resources needed for such execution, or both. Therefore, what is needed is a system, method, and product for increasing the opportunities for dynamic optimization of executable instructions.

In particular, what is needed is a system, method, and product for determining those particular sequences of instructions of an original executable file such that, if the instructions are translated and optimized, quicker execution, reduced resource usage, or both, will most likely be achieved. Such selectivity generally is advantageous because it is possible to spend more time translating and optimizing instructions than will be gained by such translation and optimization. For example, control may flow through a group of instructions that, for any of a variety of reasons, is not amenable to, or significantly benefited by, optimization. Accordingly, what is particularly needed is a system, method, and product for selecting sequences of instructions, based on control flow through such instructions at run time, that are most amenable to dynamic optimization.

SUMMARY OF THE INVENTION

The present invention is a system, method, and product for continuous path evaluation at run time in order to identify and evaluate hot traces. In one aspect of the invention, a control-path-evaluating trace designator is disclosed. The control-path-evaluating trace designator designates at least one hot trace, if present, in the original instructions of the executable file. A hot trace is a trace through which control frequently passes, or has passed more than a predetermined number of times, as determined in accordance with the invention and described below. For convenience, the term "frequent," and its grammatical variants, are used herein to refer both to control passing through instructions either at a rate, or for a number of times (sometimes referred to as the magnitude of occurrences), greater than a threshold value. In one embodiment, such threshold is predetermined. In alternative embodiments, such threshold is dynamically selected or adjusted (hereafter, simply "dynamically adjusted").

A trace typically is made up of one or more blocks of original instructions of an executable file, each of which may be reached through a common control path. A block is made up of one or more basic blocks. A basic block typically is a sequence of instructions of an executable file such that there is only one entrance into the basic block and such entrance is the first instruction in the sequence. A basic block may also consist of a single instruction. A basic block has at least one exit instruction from which control passes out of the basic block to another basic block. A control path from one block to another block is referred to herein as an arc. The action of transferring control over an arc, other than by an unconditional fall-through, is referred to as a jump. An unconditional fall-through is the unconditional passing of control from a first instruction to the instruction immediately following such first instruction. An instruction that causes a jump to occur is referred to herein as a jump instruction. The instruction to which a jump is directed is referred to herein as a target instruction.

In one embodiment, the control-path-evaluating trace designator includes a hot block manager that identifies a block as a hot block if control flows through the block at a frequency that is equal to, or greater than, a start-instruction frequency threshold. Such threshold may be predetermined, or, in alternative implementations, it may be dynamically adjusted. The hot block manager also translates and instruments the hot blocks to continuously record occurrences of control flow through them. In some implementations, the hot block manager removes hot blocks that have become cold. Such removal is undertaken if the frequency of control flow through the hot block has changed so that it has decreased to, or below, a cold-block threshold.

In one embodiment, the control-path-evaluating trace designator also includes a backpatcher that determines if a first translated hot block includes a target instruction that is a target of a jump instruction that is part of a second translated hot block. If so, the backpatcher backpatches the translated jump instruction so that control is directed through it to the target instruction.

The control-path-evaluating trace designator may also include a hot trace selector that selects at least one hot trace, if present. The hot trace is so selected if it includes a first hot block through which control has passed at a rate, or, in alternative implementations, at a magnitude, equal to or greater than a start-trace threshold. The hot trace selector also typically selects at least one additional hot block as part of the hot trace. Such additional hot blocks may include a target block of the first hot block, a target block of such target block, and so on. Such a target block is selected to be in the hot trace if control has passed through it at a rate, or, in alternative implementations, at a magnitude, equal to or greater than a trace-inclusion threshold. In some implementations, the start-trace threshold and the trace-inclusion threshold may be predetermined; in other implementations they may be dynamically adjusted.

Advantageously, the control-path-evaluating trace designator thus selects hot traces based on the dynamic behavior of the executable file. That is, a trace is typically identified as a hot trace based on the actual course of execution rather than on an estimate made at compile time, or a projection based only on initial execution, of how the file will execute.

The control-path-evaluating trace designator further may include a hot trace optimizer and instrumenter that dynamically translates hot traces. In some implementations, the hot trace optimizer and instrumenter also instruments the translated hot traces in order to record control flow through them.

Advantageously, such translated and instrumented instructions provide monitoring of the dynamic behavior of the execution of the executable file with much less loss of speed than typically would occur by alternative techniques. For example, if the original instructions of the executable file had been emulated in order to monitor such dynamic behavior, the loss of speed would typically be many times greater than the loss of speed that typically occurs by executing translated instructions. Also advantageously, such monitoring during execution of the translated instructions typically avoids some of the costs in time and memory usage generally incurred when instructions are optimized. More specifically, by deferring optimization of instructions until it is determined that a trace is executed frequently, the likelihood is increased that the increase in speed achieved by optimization, the effects of which are multiplied by frequent usage, will offset such costs of optimization.

In some implementations, the hot trace optimizer and instrumenter also dynamically optimizes the translated and instrumented hot traces. Advantageously, certain known optimization techniques may be applied at run time by a dynamic optimizer that generally could not be applied at compile time by a static optimizer. A reason for such increased capability is that the precise control flow path is known at run time with respect to the hot trace to be optimized. Thus, variables that could have a range of values depending on control flow generally have only one possible value as a result of a known control flow. Original instructions of the executable file compiled so as to accommodate such variability may therefore be optimized by the dynamic optimizer. That is, the dynamically optimized instructions may be simplified, reduced in number, or otherwise optimized because certain possibilities associated with alternative control paths not taken may be excluded.

In one embodiment, the hot trace optimizer and instrumenter also selectively removes a hot trace if control flow through it has decreased to or below a cold-trace threshold. Such threshold may be predetermined, or it may be dynamically adjusted. As used herein, and as will be understood by those skilled in the relevant art, the word "remove," and its grammatical variants, refer to any process by which memory space formerly reserved for the storage of data may be reallocated so that it may be used again to store data. For example, the original data may be erased, or, more typically, it may simply be reallocated so that it is overwritten by new data. As used herein, the term "cold trace" means that the flow of control through the instructions of an executable file has shifted during execution so that some or all of the constituent blocks of a formerly hot trace are no longer frequently executed.

Advantageously, the continuous selection and removal of hot and cold traces, respectively, is thus based on actual operating conditions and usage rather than on estimates based on the structure of the executable file such as, for example, the presence of loops, branches, switches, or other structural indicators. Such identification and removal of cold traces is particularly advantageous because time-consuming exits from a hot trace to non-translated instructions, and possibly returns to the hot trace from such instructions, may occur if the control flow through a hot trace changes. Such time-consuming operations typically are eliminated by designating the hot trace as a cold trace so that a new hot trace may be identified by the control-path-evaluating trace designator on the basis of the new control flow. Advantageously, therefore, any trace in the executable file may continuously and dynamically be designated as a hot trace and translated, reevaluated as a cold trace and its translated instructions removed from memory, re-designated as a hot trace and translated, and so on, depending on the behavior of the executable file as it is executed.

In one embodiment, the control-path-evaluating trace designator also includes a backpatcher that determines if a first translated hot trace includes a target instruction that is a target of a jump instruction that is part of a second translated hot trace or of a translated hot block. If so, the backpatcher backpatches the translated jump instruction so that control is directed through it to the target instruction.

The control-path-evaluating trace designator may also include an emulator that emulates original instructions that are not part of translated hot blocks or translated hot traces and, thus, are not frequently executed instructions. It typically is advantageous to emulate infrequently executed instructions rather than translating them. Although execution by emulation typically is much slower than execution by translation, the reduction in speed resulting from emulating infrequently executed instructions typically is not great because of the infrequency of their execution. Emulation, rather than translation, of infrequently executed instructions typically reduces the amount of memory that is used, and the time that would otherwise be spent, by other elements of the control-path-evaluating trace designator for the tasks of translating, instrumenting, analyzing, or optimizing. Also advantageously, the continued emulation of infrequently executed instructions in order to test for frequency permits the control-path-evaluating trace designator to be responsive to a change in the dynamic behavior of the executable file. Thus, original instructions that at one phase of execution were emulated may, during another phase of execution, be identified as frequently executed and consequently translated and optimized.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 202 appears first in FIG. 2, the element 1010 appears first in FIG. 10), solid lines generally indicate control flow, dotted lines generally indicate data flow, and wherein:

FIG. 6D is a partial schematic representation of one embodiment of a block-arc table containing information relating to the original instructions of FIGS. 6A and 6B, and to the translated-instrumented instructions of FIG. 6C;

FIG. 8 is a partial schematic representation of one embodiment of a hot block and hot trace look-up table including a portion of addresses of original instructions of FIG. 6A and translated addresses of translated instructions of FIG. 6C;

FIG. 11 is a partial schematic representation of one embodiment of a hot-trace counter table containing information relating to the hot trace of FIG. 10.

DETAILED DESCRIPTION

Figure 1:
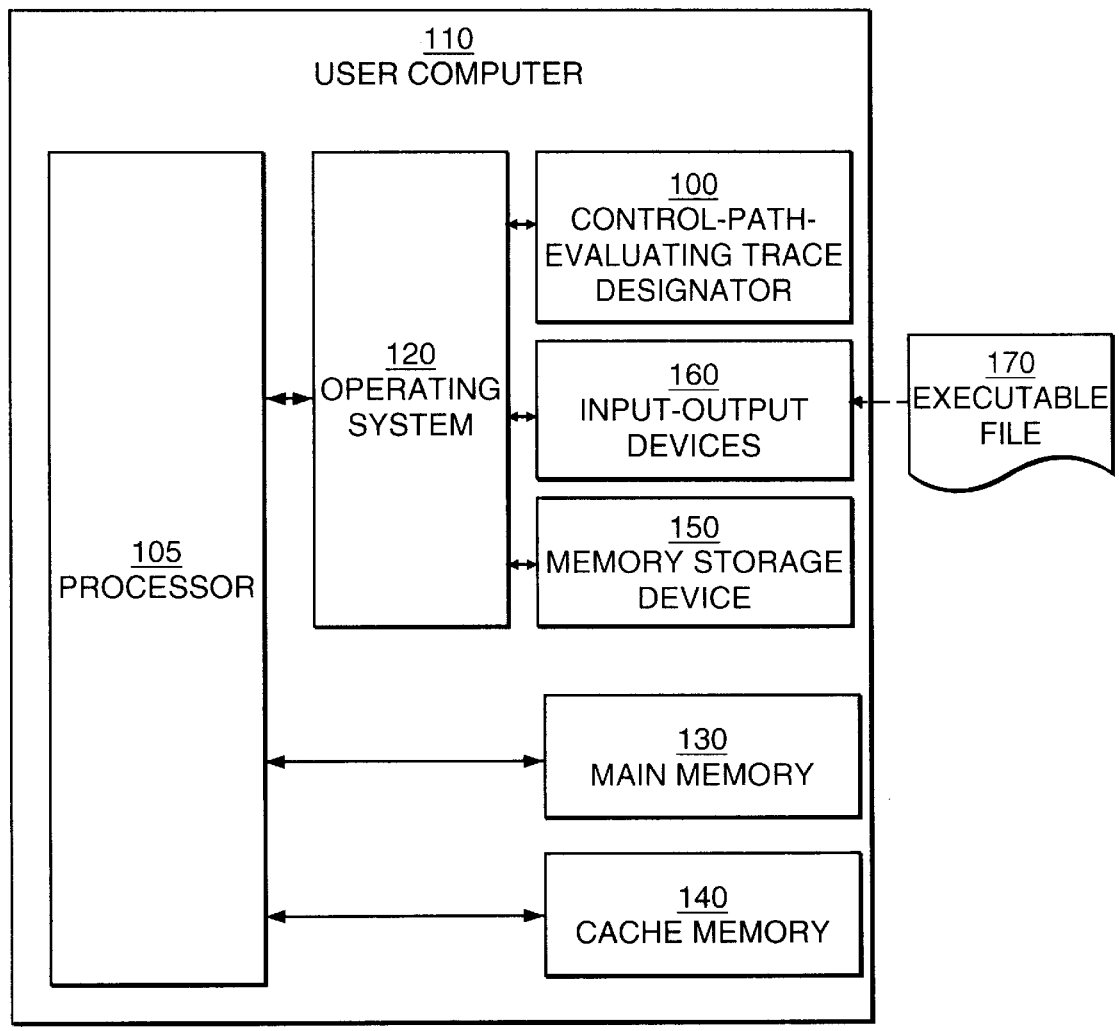
FIG. 1 is a functional block diagram of one embodiment of a computer system on which one embodiment of the control-path-evaluating trace designator of the present invention is implemented.

The attributes of the present invention and its underlying method and architecture will now be described in greater detail in reference to one embodiment of the invention, referred to as control-path-evaluating trace designator 100, or simply trace designator 100, aspects of which are represented in FIGS. 1 through 12. FIG. 1 is a functional block diagram of one embodiment of a computer system on which trace designator 100 is implemented. In this detailed description, references are made to various functional modules of the present invention that may be implemented either in software, hardware, firmware, or any combination thereof. For convenience of illustration, references generally are made to implementations in software. Such references therefore typically refer to software-implemented functional modules that will be understood to comprise sets of software instructions that cause described functions to be performed. Similarly, in a software implementation, trace designator 100 as a whole may be referred to as "a set of control-flow-evaluating-trace-designator instructions."

It will be understood by those skilled in the relevant art that the functions ascribed to trace designator 100, or any of its functional modules, typically are performed by the central processing unit (CPU) of the computer system executing such software instructions, typically in cooperation with the operating system of the computer system. More generally, it will be understood that functions performed by the invention, whether implemented in software, hardware, firmware, or any combination thereof, typically are performed by the CPU in cooperation with the operating system. Henceforth, the fact of such cooperation among the CPU, the operating system, and the modules of the invention, whether implemented in software, hardware, firmware, or any combination thereof, may therefore not be repeated or further described, but will be understood to be implied. In particular, the cooperative functions of the operating system, which are well known to those skilled in the relevant art, may be omitted for clarity.

It will also be understood by those skilled in the relevant art that the functions ascribed to trace designator 100 and its functional modules, whether implemented in software, hardware, firmware, or any combination thereof, may in some embodiments be included in the functions of the operating system. That is, for example, operating system 120 may include trace designator 100. In such embodiments, the functions of trace designator 100 may be described with reference to the execution by the CPU of a set of control-flow-evaluating-trace-designator instructions, but without reference to cooperation with a separate operating system. In such embodiments, the functions ascribed to trace designator 100, or any of its functional modules, typically are performed by the CPU executing such software instructions in cooperation with aspects of operating system 120 other than trace designator 100. Therefore, in such embodiments, cooperation by trace designator 100 with aspects of an operating system will not be stated, but will be understood to be implied.

The computer system that implements the present invention is referred to herein as the "user computer." It will be understood, however, that such term is intended to include any type of computing platform, whether or not operated by a user.

USER COMPUTER 110

FIG. 1 is a simplified functional block diagram of one exemplary embodiment of a computer system, referred to as user computer 110, on which trace designator 100 is implemented. User computer 110 may be a personal computer, network server, workstation, or other computer platform now or later developed. User computer 110 may also be a device specially designed and configured to support and execute the functions of trace designator 100 as described below. User computer 110 includes known components including processor 105, operating system 120, main memory 130, cache memory 140, memory storage device 150, and input-output devices 160. It will be understood by those skilled in the relevant art that there are many possible configurations of the components of user computer 110 and that some components that may typically be included in user computer 110 are not shown, such as a video card, data backup unit, and many other devices.

Processor 105 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, or it may be one of other processors that are or will become available. In one aspect of the illustrated embodiment, processor 105 is a PA-8000 RISC processor made by Hewlett-Packard Company.

Processor 105 executes operating system 120, which may be, for example, one of the DOS, Windows 3.1, Windows for Work Groups, Windows 95, or Windows NT operating systems from the Microsoft Corporation; the System 7 or System 8 operating system from Apple Computer; the Solaris operating system from Sun Microsystems; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. In one aspect of the illustrated embodiment, operating system 120 is the HPUX version of the Unix® operating system made by Hewlett-Packard Company. Operating system 120 interfaces with firmware and hardware in a well-known manner, and facilitates processor 105 in coordinating and executing the functions of the other components of user computer 110.

Main memory 130 may be any of a variety of known memory storage devices or future memory devices, including, for example, any commonly available random access memory (RAM), magnetic medium such as a resident hard disk, or other memory storage device. Cache memory 140 may similarly be any of a variety of known memory storage devices or future devices, including the examples noted above with respect to main memory 130.

Memory storage device 150 may be any of a variety of known or future devices, including a compact disk drive, a tape drive, a removable hard disk drive, or a diskette drive. Such types of memory storage device 150 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in main memory 130, cache memory 140, and/or the program storage device used in conjunction with memory storage device 150. Such computer software programs, when executed by processor 105, enable user computer 110 to perform the functions of the present invention as described herein. Accordingly, such computer software programs may be referred to as controllers of user computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 160 could include any of a variety of known devices for presenting information to a user, whether a human or a machine, whether local or remote. Such devices include, for example, a video monitor, printer, audio speaker with a voice synthesis device, network card, or modem. Input-output devices 160 could also include any of a variety of known removable storage devices, including a compact disk drive, a tape drive, a removable hard disk drive, or a diskette drive.

Trace designator 100 could be implemented in the "C" programming language, although it will be understood by those skilled in the relevant art that many other programming languages could also be used. Also, as noted, trace designator 100 may be implemented in any combination of software, hardware, or firmware. If implemented in software, trace designator 100 may be loaded into memory storage device 150 through one of input-output devices 160. Preferably, all or portions of trace designator 100 may also reside in a read-only memory or similar device of memory storage device 150, such devices not requiring that trace designator 100 first be loaded through input-output devices 160. It will be understood by those skilled in the relevant art that trace designator 100, or portions of it, may typically be loaded by processor 105 in a known manner into main memory 130, or cache memory 140, or both, as advantageous for execution.

Executable file 170 may be any of a variety of known executable files or an executable file of a type to be developed in the future. Examples of such known files are those having an extension of ".exe" operating under a DOS or Windows operating system or an "a.out" file of a Unix®-type operating system. Executable file 170 may typically be loaded through an input device of input-output devices 160, such as a diskette drive, and a copy of it placed by processor 105 into memory storage device 150 or main memory 130. A copy of executable file 170, or portions of it, (hereafter, simply referred to as executable file 170) may alternatively be placed by processor 105 into cache memory 140 for speedier execution. In the illustrated embodiment, it will be assumed for clarity that operating system 120 causes processor 105 to place the instructions and data of executable file 170, constituting what is referred to herein as the "original instructions," in main memory 130 for execution. The portion of main memory 130 in which such original instructions are stored is schematically represented in FIG. 2 as original instruction storage area 201.

CONTROL-PATH-EVALUATING TRACE DESIGNATOR 100

Control-path-evaluating trace designator 100 designates hot traces based on a dynamic evaluation of the control path established by the original instructions. Trace designator 100 also translates and optimizes such hot traces, and removes them if they become cold. As used herein, the term "hot trace" means a set of sequentially executed instructions through which control passes frequently, as measured in accordance with the present invention.

Figure 2:
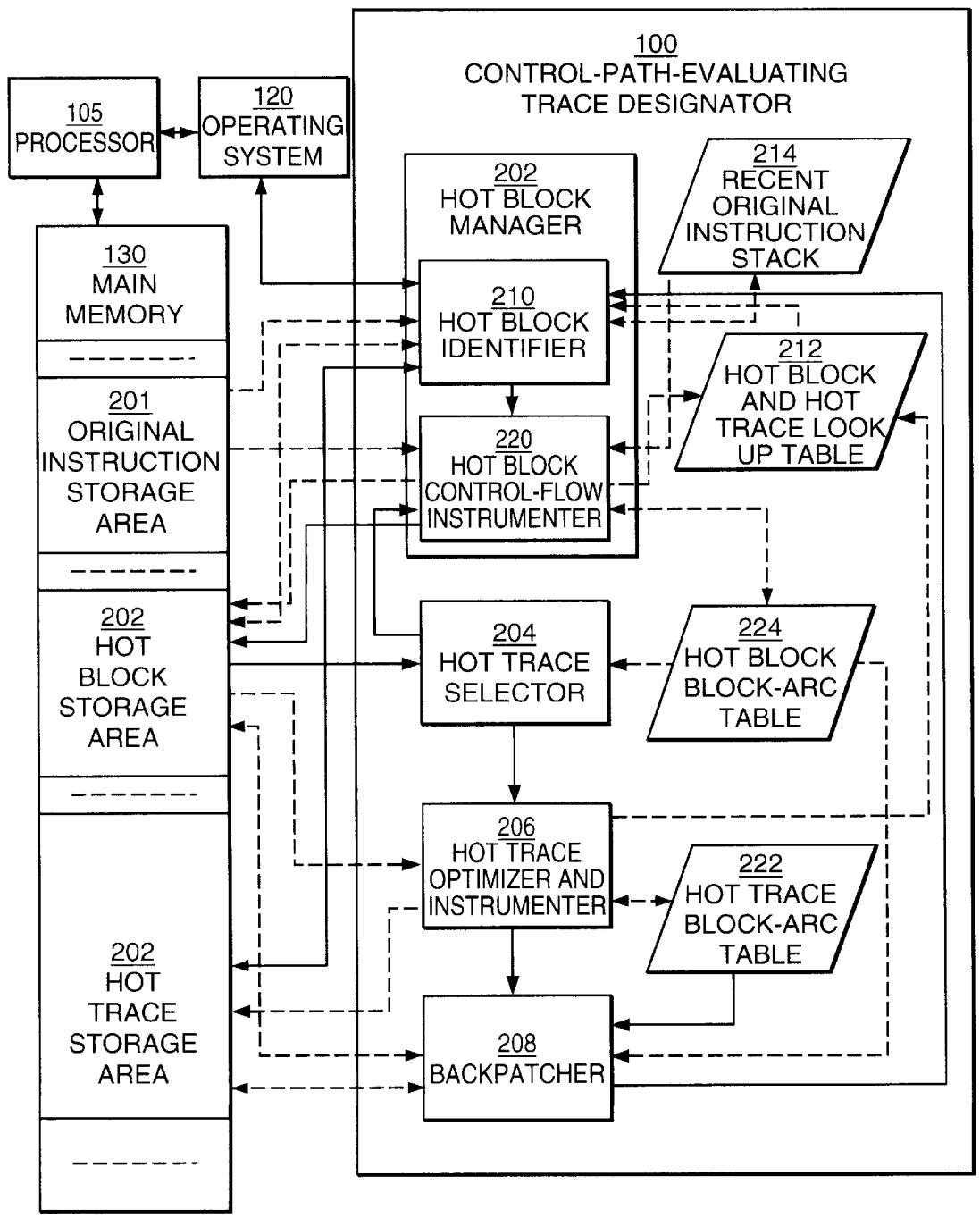
FIG. 2 is a functional block diagram of one embodiment of the control-path-evaluating trace designator of FIG. 1, including its input and output connections to other elements of the computer system of FIG. 1.

As shown in FIG. 2, trace designator 100 includes hot block manager 202, hot trace selector 204, hot trace optimizer and instrumenter 206, and backpatcher 208. Hot block manager 202 identifies as hot blocks those blocks having a starting target instruction through which control passes at a frequency equal to or greater than a start-instruction frequency threshold. Hot block manager 202 also translates and instruments such hot blocks so that the control flow through them may be recorded. Hot block manager 202 selectively removes a hot block if control flow through it has changed so that it is no longer frequently executed, as measured in accordance with the present invention. If control passes through an arc of a hot block a number of times that is equal to a start-trace threshold, hot trace selector 204 selects a hot trace including such hot block. Hot trace selector 204 also includes in such hot trace those blocks related to such hot block that have arc counters greater than a trace-inclusion threshold. Hot trace optimizer and instrumenter 206 dynamically translates and optimizes hot traces, and instruments such translated hot traces so that control flow through them may be recorded to determine whether they have become cold. Hot trace optimizer and instrumenter 206 selectively removes a hot trace if control flow through it has changed so that the trace, or a portion of it, is no longer frequently executed. Backpatcher 208 examines a newly translated hot block to determine if previously translated hot blocks or hot traces have jump instructions that jump to it. If so, backpatcher 208 backpatches such jump instructions so that they jump to the newly translated hot block. Similarly, backpatcher 208 examines a newly translated hot trace to determine if previously translated hot blocks or hot traces have jump instructions that jump to it. If so, backpatcher 208 backpatches such jump instructions so that they jump to the newly translated hot trace.

HOT BLOCK MANAGER 202

Hot block manager 202 identifies and instruments hot blocks and stores them in main memory 130. As shown in FIG. 2, hot block manager 202 includes hot block identifier 210 and hot block control-flow instrumenter 220. Identifier 210 determines if the frequency of execution of a target instruction has equaled or exceeded the start-instruction frequency threshold, and, if such threshold has been reached, designates the target instruction as the start of a hot block. Identifier 210 also designates an instruction as the end of the hot block. Hot block control-flow instrumenter 220 translates and instruments the hot block so that control flow through it may be recorded. Instrumenter 220 also stores the instrumented hot block into storage area 202 of main memory 130.

HOT BLOCK IDENTIFIER 210

Figure 3:
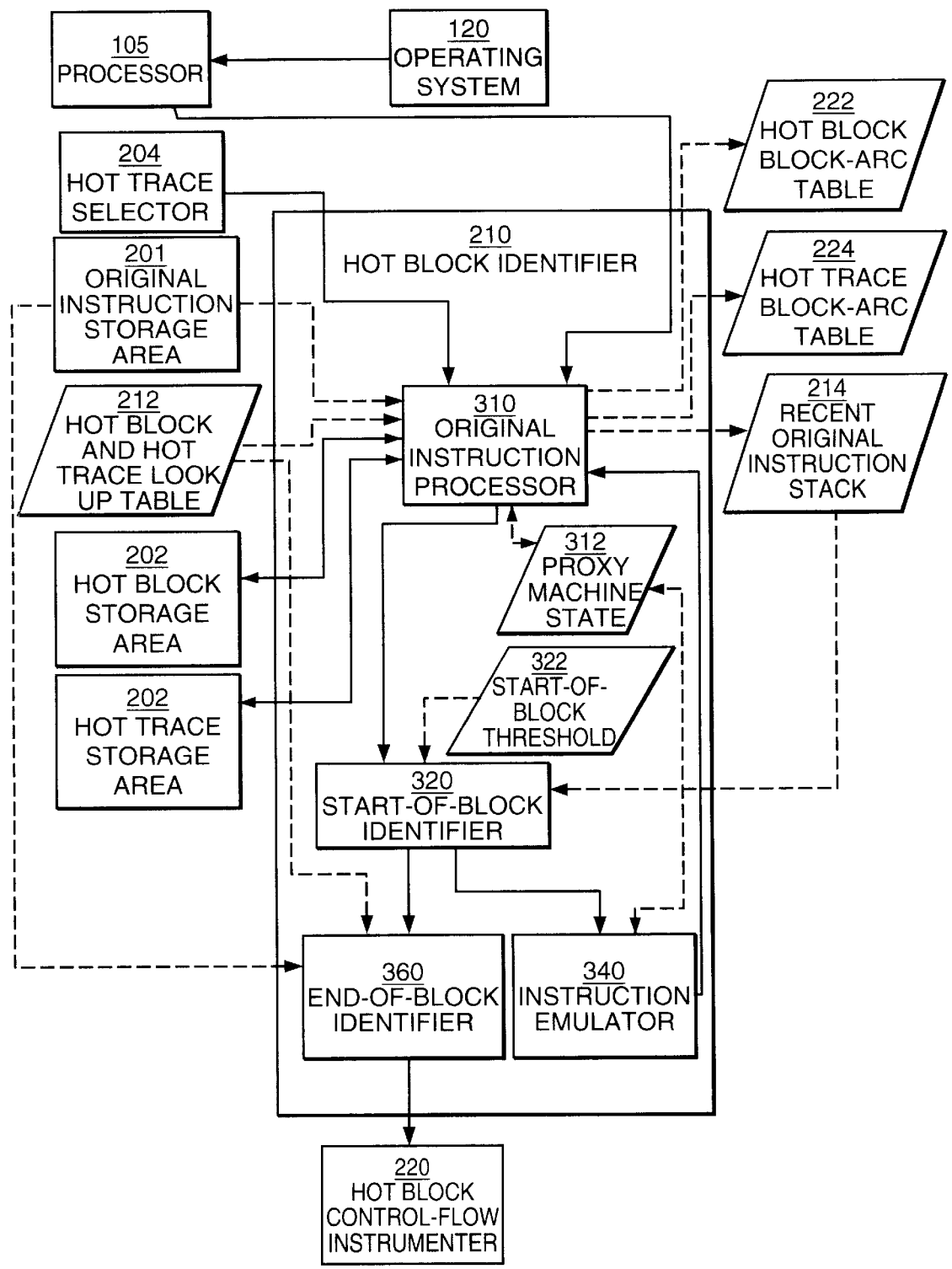
FIG. 3 is a functional block diagram of one embodiment of the hot block identifier of the control-path-evaluating trace designator of FIG. 2, including the input and output connections of the hot block identifier to other elements of the control-path-evaluating trace designator of FIG. 2 and of the computer system of FIG. 1.

As noted, hot block identifier 210 identifies the starting and ending instructions of hot blocks. As shown in FIG. 3, hot block identifier 210 includes original instruction processor 310 that, in cooperation with operating system 120, suspends conventional execution of original instructions by processor 105, preserves a record of the machine state as of such suspension of conventional execution, and retrieves original instructions from memory 130 for processing. Original instruction processor 310 also directs control to a translated instruction for execution if an original instruction has such a corresponding translated instruction, and also records control flow through target instructions that do not have corresponding translated instructions. Hot block identifier 210 also includes start-of-block identifier 320 that compares the start-instruction frequency threshold with the frequency with which control passes through target instructions. Start-of-block identifier 320 designates a target instruction as the starting instruction of a hot block if such threshold has been reached or exceeded. Hot block identifier 210 further includes instruction emulator 340 that emulates certain original instructions. Hot block identifier 210 also includes end-of-block identifier 360 that identifies the ending instruction of a hot block.

Figure 4:
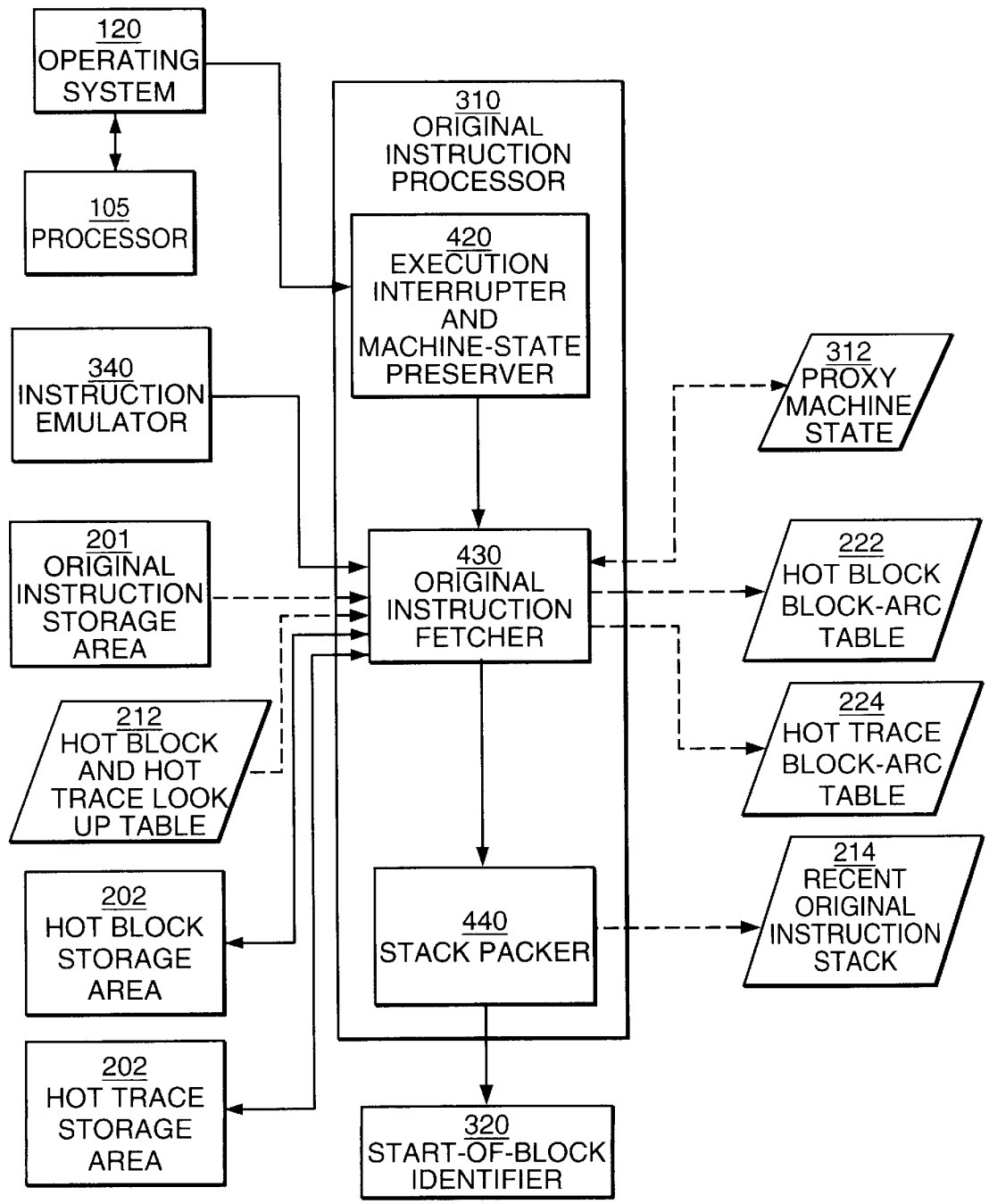
FIG. 4 is a functional block diagram of one embodiment of the original instruction processor of the hot block identifier of FIG. 3, including the input and output connections of the original instruction processor to other elements of the control-path-evaluating trace designator of FIG. 2 and of the computer system of FIG. 1.

Original instruction processor 310. As noted, original instruction processor 310 generally directs the processing of original instructions and records the control flow through target instructions. Original instruction processor 310 also is the default location to which control passes from any element of trace designator 100 if the address of the next instruction to be executed is not available to such element. As shown in FIG. 4, original instruction processor 310 includes execution interrupter and machine-state preserver 420 that suspends conventional instruction execution by processor 105 and saves the current machine state of processor 105. Original instruction processor 310 also includes original instruction fetcher 430 that fetches original instructions from main memory 130. Original instruction processor 310 further includes stack packer 440 that assigns a unique identifier to certain original instructions and records the passage of control through such instructions.

Execution Interrupter and Machine-state Preserver 420.

Execution interrupter and machine-state preserver 420 operates in accordance with any of a variety of known techniques. Generally, interrupter-preserver 420 cooperates with operating system 120 to cause processor 105 to save its current machine state and to pass control over execution of the original instructions from processor 105 to original instruction fetcher 430. As is well known to those skilled in the art, the current machine state typically includes the values of registers, status flags, system memory locations, the program counter, and other values (not shown) that enable processor 105 to resume conventional processing without error. Interrupter-preserver 420 makes a copy of the machine state saved by processor 105 and stores the copy in a data structure referred to herein as proxy machine state 312 (shown in FIGS. 3 and 4). The data elements in proxy machine state 312 are referred to herein as "proxy" data because they are a copy of the machine state saved by processor 105 that enables translator 100 to emulate original instructions, and execute translated instructions, while maintaining the machine state values at the values they would have had if processor 105 had conventionally executed the original instructions.

If original instruction fetcher 430 determines that the operation of trace designator 100 should be terminated, either because such operations have been completed, an error condition has been detected, or for another reason, control is returned to interrupter-preserver 420. Such determination is made in accordance with any of a variety of known techniques. Interrupter-preserver 420 then, in a known manner, accesses the machine state values stored in proxy machine state 312 and provides such values to processor 105 as initial conditions for resuming conventional execution. However, changes in the machine state values typically occur every time an instruction is executed or emulated. Thus, the values in proxy machine state 312 after designator 100 has operated typically are not the same as those saved by processor 105 when it ceased conventional execution. In a known manner, interrupter-preserver 420, in cooperation with operating system 120, returns conventional instruction execution to processor 105.

Original Instruction Fetcher 430.

Original instruction fetcher 430 in a known manner fetches an instruction from original instruction storage area 201, typically starting with the first original instruction. Hereafter, the original instruction most recently fetched by original instruction fetcher 430 is referred to as the "current original instruction." In the illustrated embodiment, the address of the current original instruction in original instruction storage area 201 advantageously serves as its unique identifier, although it need not be so. It is not material to the present invention whether such unique identifier is the absolute address of the current original instruction, its address relative to a base address, an address obtained from a hash table, or another representation. Upon fetching the current original instruction, original instruction fetcher 430 typically increments the proxy program counter that is one of the data elements of proxy machine state 312.

Original instruction fetcher 430 selectively directs control to a corresponding translated instruction if the current original instruction has been translated. In the illustrated embodiment, fetcher 430 performs this function by determining if the current original instruction is part of a basic block that is currently identified as a hot block. Alternatively, fetcher 430 determines if the current original instruction is part of a current hot trace. Fetcher 430 performs these functions by applying any of a variety of known techniques, such as search and compare techniques, to compare the unique identifier of the current original instruction with unique identifiers of original instructions that have been translated.

In the illustrated embodiment, such comparison is done by accessing the data structure shown in FIG. 8 and referred to as hot block and hot trace look-up table 212. In particular, the unique identifiers are stored in column 212A. As noted, the unique identifiers of the illustrated implementation are representations of the original instruction addresses. These, and other, entries in look-up table 212 are described in greater detail below with respect to hot block storage locator 710 (that stores beginning addresses of hot blocks in column 212B) and hot trace storage locator 1210 (that stores beginning addresses of hot traces in column 212C).

Original instructions are correlated in look-up table 212 with their corresponding translated instructions, if any, in either hot block storage area 202 or hot trace storage area 203. Thus, a match for the unique identifier of the current original instruction in look-up table 212 indicates that such instruction has been translated and is stored either in hot block storage area 202, hot trace storage area 203, or both. If a match is found with a translated instruction in hot trace storage area 203, fetcher 430 transfers control to such corresponding translated instruction. If there is no such match, but there is a match with a translated instruction in hot block storage area 202, fetcher 430 transfers control to such corresponding translated instruction. In either case, such translated instruction is then executed, and control flow proceeds in accordance with such execution. In particular, if the current original instruction is part of a hot block and not a hot trace, control passes in accordance with the translated instructions of the hot block. Control passes out of the hot block either to hot trace selector 204 (if a start-trace threshold has been reached) or back to fetcher 430 (if such threshold has not been reached) so that fetcher 430 may fetch the next original instruction for processing, as described above (such next original instruction thus becoming the current original instruction). Original instruction fetcher 430 also periodically increments the arc counters of hot block block-arc table 222 and of hot trace counter table 224 so that cold blocks and cold traces may be detected, as described below with respect to the operations of cold block detector 720 and cold trace detector and remover 1220, respectively.

It is now assumed for illustrative purposes that fetcher 430 does not find a match between the identifier of the current original instruction and a corresponding translated instruction in either hot block storage area 202 or hot trace storage area 203. Fetcher 430 then transfers control to stack packer 440.

Stack Packer 440.

Stack packer 440 places unique identifiers of selected current original instructions into recent original instruction stack 214. Stack 214 typically is a data structure that, like other data structures described hereafter, typically is stored in main memory 130. For convenience of identification, data structures are depicted in the drawings of the illustrated embodiment as parallelograms. In the illustrated embodiment, stack 214 is a one-dimensional array of a predetermined stack height, such height referred to for convenience as "H," where H is an integer. Stack 214 thus provides for the storage of up to H unique identifiers of original instructions. As a new unique identifier is placed on the top of stack 214 by stack packer 440, the entries for previously entered unique identifiers in the stack are pushed down one slot in accordance with any of a variety of known techniques. If the H'th (bottom) slot is occupied, then the unique identifier in such slot is pushed out of the stack when the new unique identifier is added. In this manner, stack 214 maintains a record of the unique identifiers of instructions that have most recently been encountered by original instruction fetcher 430.

In the illustrated embodiment, stack packer 440 only inserts the unique identifier of an original instruction into stack 214 if such original instruction is identified as a target instruction (or the first original instruction fetched from original instruction storage area 201.) Any of a variety of known techniques may be employed to identify target instructions. For example, original instruction fetcher 430 may set a flag (not shown) upon encountering a jump instruction so that the next original instruction encountered is identified as a target instruction. Original instruction fetcher 430 may identify a jump instruction by employing any of a variety of known search-and-compare techniques to compare the format, syntax, or other attribute of an original instruction to a table of known attributes of jump instructions, or by employing other techniques now known or to be determined in the future.

Figures 6A, 6B, 6C:
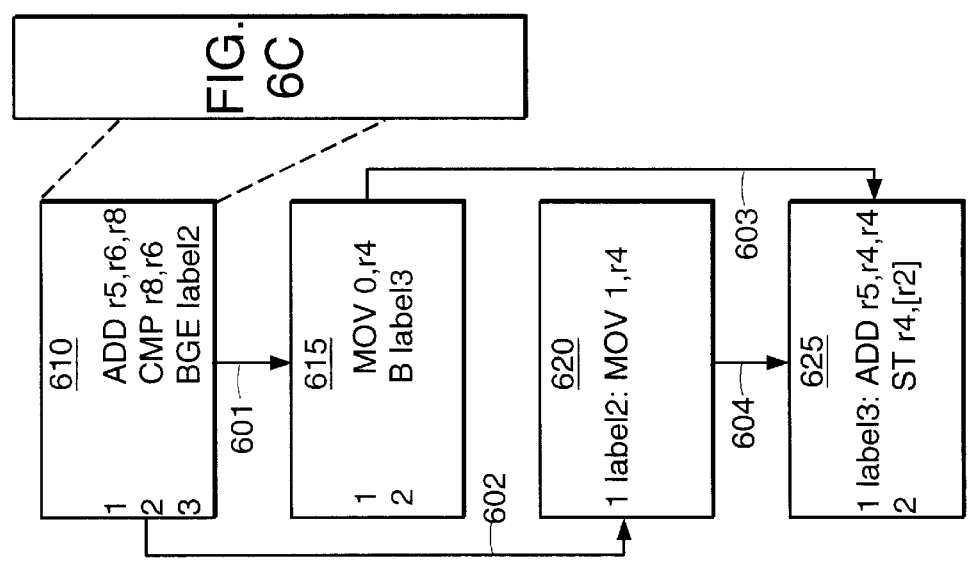
FIG. 6A is a listing of a portion of exemplary original instructions suitable for processing by the control-path-evaluating trace designator of FIG. 2.
FIG. 6B is a graphical representation of the original instructions of FIG. 6A grouped in illustrative hot blocks as identified by the hot block identifier of FIG. 3, and showing arcs between pairs of such hot blocks as designated by the hot block control-flow instrumenter of FIG. 5.
FIG. 6C is an exemplary illustration of a translation with hot trace detection of a portion of the original instructions of FIGS. 6A and 6B.

It is possible that a target instruction may not be identified by such technique. For example, control may pass through an unconditional fall through from a first instruction to a second instruction that immediately follows. Such second instruction may be a target instruction even though the instruction from which control passed to it, i. e., the first instruction in this example, is not a jump instruction. (An example of such a circumstance is shown in FIG. 6A, described below, in which the instruction at line 7 of original instructions 605 is a target instruction, through which control may pass through an unconditional fall through from the instruction at line 6, even though the instruction at line 6 is not a jump instruction.) In such a case in which a target instruction is not identified as such, a hot block may be identified, as described below, that includes more than one basic block; i. e., control may enter into the hot block through more than one instruction of the hot block.

Consequently, two or more hot blocks may be identified that include the same basic block. Such a result could obtain, for example, if a first hot block, referred to as "HB-1," is identified that contains the unidentified target instruction, referred to as "T," and, subsequently, control passes through a jump instruction to T so that T is then identified as a target instruction. A new hot block, "HB-2," may then be identified that starts with T, even though T is already included in HB-1. Such a result may cause duplication of code in hot block storage area 202 because T, and subsequent instructions in its basic block, would then typically be present in translated form in both HB-1 and HB-2. Such duplication is not material to the functioning of the invention, although, in some circumstances, additional space in hot block storage area 202 may be required to accommodate the duplicated code. Moreover, as noted, original instruction fetcher 430 determines whether an instruction has been translated before passing control to stack packer 440. Thus, if T has been translated in accordance with the translation of HB-1 (or is part of an optimized hot trace), T is typically identified by fetcher 430 as a translated instruction and control passes to the translated T for execution. Thus, T's unique identifier is not placed in stack 214, and HB-2 is not separately identified.

Except for the first original instruction fetched, instructions represented by a unique identifier in recent original instruction stack 214 in the illustrated embodiment are target instructions, for the reasons described above. Therefore, the contents of stack 214 are hereafter referred to for convenience as target identifiers. A target instruction will hereafter be referred to as a "frequently encountered target instruction" if its corresponding target identifier appears concurrently F times or more in stack 214, where F is an integer that is the start-instruction frequency threshold. Because the contents of stack 214 generally change as a function of the described stack-packing process, stack 214 is a form of frequency detector. In this context, frequency refers to the rate at which target instructions are processed by stack packer 440. Any of a variety of techniques, now known or to be developed in the future, for detecting frequency may be employed in other embodiments.

It is advantageous to include only target identifiers in stack 214 because a target instruction typically is the starting instruction of a block. As described below, a jump instruction typically is the ending instruction of a block. Thus, identification of a target instruction advantageously serves as identification of a block. More specifically, identification of a frequently encountered target instruction generally is functionally equivalent to identification of a frequently encountered block. Therefore, it is generally sufficient and advantageous to place only target identifiers into stack 214. In alternative embodiments, identifiers for all, or any subgrouping of, original instructions could be placed in stack 214, but the size of such stack would therefore generally be required to be larger than is required for the illustrated embodiment.

The values for H and F may advantageously be chosen to influence whether a target instruction, and thus the block starting with such instruction, will be designated as being frequently encountered. As described below, only frequently encountered blocks are processed as hot blocks in accordance with the illustrated embodiment. Thus, smaller numbers of blocks generally may be subject to such processing by decreasing the value of H, increasing the value of F, or both. Conversely, greater numbers of blocks generally may be subject to such processing by increasing the value of H, decreasing the value of F, or both.

As described below, original instructions generally are emulated if they are not identified as part of a hot block, and therefore translated. Advantageously, the values of H or F may therefore be varied to increase or decrease the proportion of original instructions that are translated by hot block control-flow instrumenter 220 as contrasted with being emulated by instruction emulator 340. As also described below, emulation is typically much slower than execution of translated instructions. Translated instructions, however, typically are stored in memory, whereas emulation does not typically require long-term memory storage. Therefore, the values of H or F may be varied to achieve particular requirements or desired results with respect to execution time or available memory.

The choice of a value for H may also depend on the amount of memory available to store the information contained in stack 214. Additionally, the choice of a value for H may depend on the speed of processor 105. A fast processor typically executes a larger number of instructions in a given period of time than does a slow processor and, thus, a larger number of addresses typically will be placed in stack 214 by the fast processor. Because executable file 170 may be programmed to await an external event, such as the moving of a mouse, a fast processor could fill stack 214 with infrequently executed instructions and thus inhibit the detection of frequently executed instructions. Such an occurrence is less likely if the size of stack 214 is increased.

In the illustrated embodiment, H and F are predetermined integers. In other embodiments, the values of either H or F, or both, may be dynamically adjustable. For example, start-of-block identifier 320 may include counters and a comparator (not shown) to dynamically count, and determine the ratio between, translated instructions and emulated instructions in a known manner. If such counts or ratio indicate that too few original instructions are being translated, as determined by comparing dynamic performance to a predetermined desired performance, then H could be increased, F could be decreased, or both. Similarly, H could be decreased, F could be increased, or both, if such counts or ratio indicate that too many original instructions are being translated.

Start-of-block identifier 320. As noted, start-of-block identifier 320 designates a target instruction as the starting instruction of a hot block if the frequency with which control passes through the target instruction reaches or exceeds the start-instruction frequency threshold, F. If the current original instruction is not a target instruction, as determined in the manner described above and recorded by any known means, such as a flag (not shown), then start-of-block identifier 320 does not make such determination and merely passes control to instruction emulator 340. It is therefore assumed, for purposes of describing the operation of identifier 320, that the current original instruction is a target instruction.

Start-of-block identifier 320 employs any of a variety of known techniques, such as search-and-compare techniques, to search stack 214 and count the number of occurrences of the unique identifier of the current original instruction. Start-of-block identifier 320 employs any of a variety of known techniques to compare such number of occurrences with the value of the start-of-block threshold, F. As noted, the current original instruction is considered to be frequently encountered if the number of such occurrences is F or more. If such condition is met, control is transferred to end-of-block identifier 360. If the number of occurrences is less than F, control passes to instruction emulator 340.

Instruction emulator 340. As noted, control passes to instruction emulator 340 either if the number of occurrences of the target identifier of the current original instruction is less than the start-instruction frequency threshold, F, or if the current original instruction is not a target instruction. Thus, emulator 340 emulates every original instruction except one that is identified by start-of-block identifier 320 as being the start of a hot block (or has been identified by original instruction fetcher 430 as having a corresponding translated instruction, as noted above). It is now assumed for illustrative purposes that either the current original instruction is not a target instruction, or that its target identifier is found less than F times in stack 214. Thus, the current original instruction is not the start of a hot block, and is therefore emulated.

Instruction emulator 340 mimics the operations that processor 105 would have applied to the current original instruction if execution interrupter and machine-state preserver 420 had not suspended conventional instruction execution of executable file 170 by processor 105. However, rather than the original instruction being executed, emulated instructions are executed. The results of such emulated instructions generally are identical to the results that would have been obtained by the execution of the current original instruction by processor 105. Also, for every emulated instruction, emulator 340 changes the values in proxy machine state 312 so that they are the same as the machine state values that would have been generated by processor 105 if the corresponding original instruction had been conventionally executed. Such emulation takes place in accordance with any of a variety of known techniques using software, firmware, hardware, or a combination thereof. After instruction emulator 340 has emulated the current original instruction, it typically increments the proxy program counter in a known manner.

Typically, instruction emulator 340 causes emulated instructions to be executed substantially more slowly, for example, 10 to 100 times more slowly, than the original instructions would have been executed by processor 105. Such slowing down may be due to any of a variety of known factors. For example, the proxy values of status flags, registers, and other proxy data elements of proxy machine state 312, as well as contents of addresses pointed to by some of such proxy data elements, may be required to be accessed, moved, their new location recorded, and subsequently accessed and moved back to their original locations. Such time-consuming operations may be necessary in order to avoid conflicts with the operations of instruction emulator 340 itself or other elements of trace designator 100. Such additional time consumed by emulation may generally be reduced by translating the current original instruction into a translated instruction or instructions to which control is then passed for execution. However, as noted, such translation, unlike emulation, requires that additional space be assigned in memory for a period longer than the time required for the initial execution. That is, instruction emulator 340 creates the emulation instructions and executes them. Once the emulated instructions are executed, they typically are no longer present in memory, although it need not be so in another embodiment. In contrast, translated instructions are created and then typically stored in memory so that they may be executed repeatedly without being re-created. After emulating the current original instruction, instruction emulator 340 passes control to original instruction fetcher 430.

End-of-block identifier 360. It is now assumed for illustrative purposes that start-of-block identifier 320 has identified the current original instruction as the starting instruction of a hot block, referred to hereafter for clarity as the "current hot block." As noted, control is thus passed to end-of-block identifier 360 so that it may determine the end of the current hot block. In the illustrated embodiment, end-of-block identifier 360 performs this function by scanning the original instructions in original instruction storage area 201. The scanning starts with the frequently executed target instruction that has been designated as the start of the current hot block. In the illustrated embodiment, the last instruction may be determined according to either of two criteria, whichever is first satisfied. According to the first criterion, end-of-block identifier 360 continues scanning the original instructions until it identifies a jump instruction. Such identification typically is carried out in the manner described above with respect to the identification of a jump instruction by original instruction fetcher 430. Such jump instruction is designated as the end of the current hot block if it is encountered before the second criterion is satisfied.

According to the second criterion, end-of-block identifier 360 continues scanning until it encounters a target instruction. In the illustrated embodiment, end-of-block identifier 360 recognizes target instructions by comparing the unique identifier of each scanned original instruction with the target identifiers in stack 214. Such unique identifiers are also compared with the unique identifiers in column 212A of look-up table 212. The generation of such entries in look-up table 212 are described below with respect to FIG. 8. If there is a match in either stack 214 or table 212, then the matching original instruction is identified as a target instruction. It is not material to the present invention whether stack 214 and table 212 are searched concurrently, sequentially, or in some combination thereof. It also is not material whether stack 214 is searched before or after table 212, and, in some embodiments, one, but not both, of stack 214 and table 212 may be searched. In other embodiments, any technique now known, or to be developed in the future, may be used to identify a target instruction. The instruction preceding the identified target instruction is designated as the end of the current hot block if it is encountered before the first criterion is satisfied.

Thus, a hot block in the illustrated embodiment is a sequence of instructions that includes a starting instruction that is a frequently executed target instruction, and has an ending instruction that is either a jump instruction or an instruction through which control falls through to an identified target instruction. However, it need not be so in alternative embodiments. A hot block could be otherwise defined; for example, it could end at a second or subsequent external jump instruction, thus typically including greater numbers of blocks. Generally, embodiments employing hot blocks containing larger numbers of blocks may save processing time required to separately identify such blocks as hot blocks, but may also require greater amounts of memory due to the possibility of duplicated code in hot block storage area 202, as noted.

The functions of end-of-block identifier 360 are now further described with reference to FIGS. 6A, 6B, and 8. FIG. 6A is a listing of a portion of exemplary original instructions, collectively labeled instructions 605, to be processed by trace designator 100. FIG. 6B is a graphical representation of the original instructions of FIG. 6A grouped in illustrative hot blocks as identified by hot block identifier 210, and showing arcs between pairs of such hot blocks as designated by hot block control-flow instrumenter 220. (FIG. 6C is an exemplary illustration of a translation of block 610, including hot trace detection, that will be described below in relation to the operations of hot block control-flow instrumenter 220. FIG. 6D is a portion of one embodiment of hot block block-arc table 222, containing information related to the instructions of FIGS. 6A and 6B, also described below in relation to instrumenter 220.) The numbers to the left of each instruction in FIGS. 6A–6C are for convenience of reference only and are not part of the instructions. Also for convenience of reference, instructions in FIGS. 6A–6C are hereafter referred to in a form "6xx-y" indicating both the group of instructions or the block (such as 605 or 610) and the number (such as 1, 2, etc.) of a specific instruction within that group or block. For example, instruction 610-2 will be understood to be the instruction in block 610 indicated by the number 2 to the left of the instruction.

It will be understood by those skilled in the relevant art that the instructions represented in FIGS. 6A–6C are intended only to be illustrative of the functions of the instructions of a typical executable file. For example, it will be understood that addresses for targets of jump instructions typically have been resolved in an executable file, so that a target label, such as "label2" of instruction 605-6 of FIG. 6A, is typically not found in an executable instruction and thus is illustrative only.

It is now assumed for illustrative purposes that instruction 605-1 has been identified by start-of-block identifier 320 as a frequently executed target instruction. Thus, as described above, end-of-block identifier 360 begins scanning the original instructions at instruction 605-1, looking for a jump instruction or a target instruction. Instruction 605-3 is a jump instruction, and thus end-of-block identifier 360 designates it as the end of the current hot block. Therefore, in this example, the current hot block consists of instructions 605-1, 605-2, and 605-3 of FIG. 6A. The current hot block is also graphically illustrated in FIG. 6B as hot block 610, consisting of instructions 610-1, 610-2, and 610-3.

End-of-block identifier 360 makes such end-of-block determination because instruction 605-3 contains the instruction terminology "BGE label2," which will be understood to represent a conditional jump (a jump is typically represented by "B," for the verb "branch," which is synonymous with the verb "jump" as used herein) to the instruction at the address represented by "label2." As noted, such address of the target instruction typically has been resolved in executable file 170, and such label is therefore included here only for clarity of illustration. Such jump occurs if the result of execution of the comparison, indicated by the instruction fragment "CMP" of instruction 605-2, satisfies the condition of the jump instruction. The condition is, in this illustrative example, that the value in register 8 is greater than or equal to ("GE") the value in register 6.

Having designated instructions 605-1 and 605-3 as respectively marking the start and end of the current hot block, end-of-block identifier 360 employs any of a variety of known techniques, such as search and compare techniques, to determine if the unique identifier of any of such instructions matches any entry in column 212A of hot block and hot trace look-up table 212, described below. (In the illustrated embodiment, it may typically be assured that the unique identifier of the starting instruction is not found in table 212, else fetcher 430 would have transferred control to the translated instruction corresponding to the starting instruction, and end-of-block identifier 360 would not have been invoked.) In the illustrated embodiment, as noted, such unique identifier is the address of the instruction in original instruction storage area 201. It is assumed for illustrative purposes that instructions 605-1 through 605-3 have not previously been designated as part of a hot block; thus, no match is found in table 212.

End-of-block identifier 360 creates a record in table 212 for each original instruction of the current hot block with respect to which such a record has not already been created; i.e., instructions 605-1 through 605-3 of the present example. FIG. 8 is a partial schematic representation of one embodiment of hot block and hot trace look-up table 212. Each row in table 212 represents a record corresponding to one original instruction. For example, row 1 (also referred to as record 1) in the illustrative example of FIG. 8 contains information related to original instruction 605-1. As indicated by the four columns, 212A–212D, each record has four fields. The first field, as indicated by column 212A, contains a representation of the address in original instruction storage area 201 of the original instruction. The bracket symbols are used in table 212 for convenience to represent an address of the instruction identified within the brackets. Thus, the entry "[605-1]" in record 1 under column 212A represents the address of instruction 605-1. End-of-block identifier 360 makes such an entry in column 212A for each of instructions 605-1 through 605-3, as illustrated in FIG. 8. It will be understood that the leftmost column in table 212 containing the row or record numbers, and the top row containing column descriptions, are provided for illustrative purposes only and are not part of the data structure of table 212.

End-of-block identifier 360 also makes an entry in column 212D for each instruction in the current hot block to indicate whether each instruction is a target instruction. Arbitrarily, the value "1" is chosen in the illustrated embodiment of table 212 to indicate that the original instruction identified in column 212A of the corresponding record has been identified as a target instruction. The value "0" is chosen to indicate that the original instruction has not been identified as a target instruction. It will be understood by those skilled in the relevant art that, in other embodiments, any of a variety of other known techniques could be used in table 212, or in any of numerous other data structures that could be employed, to indicate whether an original instruction is a target instruction. As noted, the described entries in columns 212A and 212D enable end-of-block identifier 360 to search the fields in column 212A for each record of table 212 to determine whether an original instruction has been entered in the table and, if the corresponding flag value in the column-212D field of a matching record is "1," to identify the original instruction as a target instruction. Having made such entries in table 212, end-of-block identifier 360 transfers control to hot block control-flow instrumenter 220.

Hot Block Control-Flow Instrumenter 220

As noted, hot block control-flow instrumenter 220 translates and instruments the hot block so that control flow through it may be recorded, and stores the instrumented hot block into hot block storage area 202. Control-flow instrumenter 220 also assigns unique identifiers to the arcs to and from the hot block and stores such unique identifiers in hot block block-arc table 222.

Figure 5:
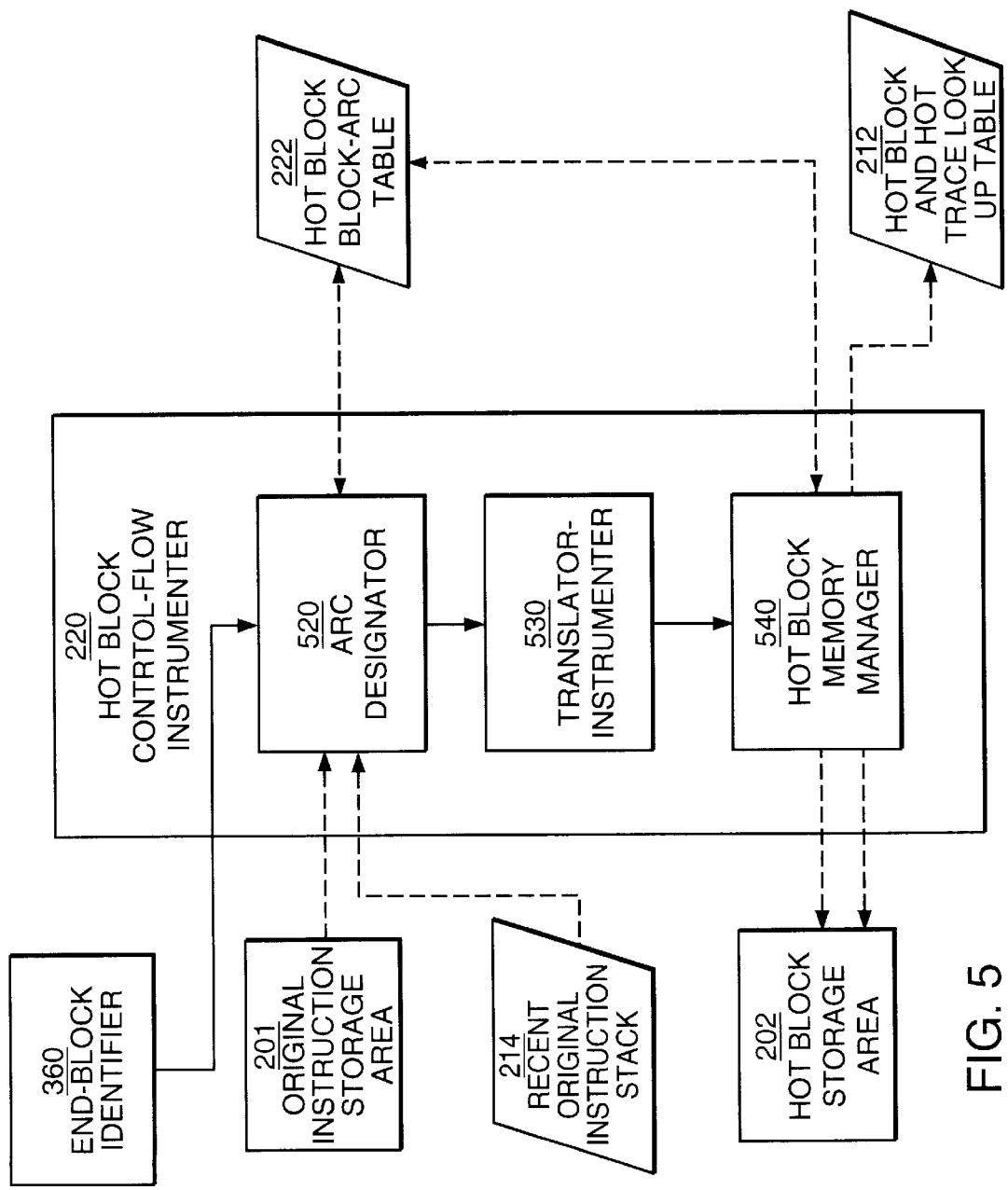
FIG. 5 is a functional block diagram of one embodiment of the hot block control-flow instrumenter of the control-path-evaluating trace designator of FIG. 2, including the input and output connections of the hot block control-flow instrumenter to other elements of the control-path-evaluating trace designator of FIG. 2 and of the computer system of FIG. 1.

The functions of hot block control-flow instrumenter 220 are shown in greater detail in FIG. 5. Hot block control-flow instrumenter 220 includes arc designator 520 that assigns and stores unique arc identifiers, translator-instrumenter 530 that translates and instruments the current hot block, and hot block memory manager 540 that stores the translated and instrumented current hot block into hot block storage area 202 and selectively removes from storage area 202 those hot blocks that have become cold.

Arc designator 520. Arc designator 520 creates a record in hot block block-arc table 222 for the current hot block. FIG. 6D is a partial schematic representation of one embodiment of hot block block-arc table 222. Each row in table 222 represents a record corresponding to one hot block. It will be assumed for illustrative purposes that record 1 is the record created by arc designator 520 to store information related to the current hot block. As indicated by the seven columns, 222A through 222G, each record has seven fields. The first field, as indicated by column 222A, contains a representation of the address in original instruction storage area 201 of the starting (target) instruction of the hot block. As with respect to FIG. 8, the bracket symbols are used in table 222 for convenience to represent an address of the instruction identified within the brackets. Thus, arc designator 520 enters an address, represented in this illustrative example by the term "[605-1]," in record 1 under column 222A. Such term represents the address of instruction 605-1, the starting address of the current hot block, in original instruction storage area 201. It will be understood that the leftmost column in table 222 containing the row or record numbers, and the top row containing column descriptions, are provided for illustrative purposes only and are not part of the data structure of table 222. It will be understood that there are many variations of the data storage scheme described herein with respect to table 222 that may be employed in alternative embodiments.

Arc designator 520 creates entries for columns 222B through 222G of record 1 by analyzing control flow out of the current hot block. Such evaluation is now described in reference to FIG. 6B, which schematically shows illustrative potential control paths out of current hot block 610 of the present example. Such control paths are represented in FIG. 6B by arc 601 connecting current hot block 610 with block 615 (consisting of original instructions 605-4 and 605-5), and by arc 602 connecting current hot block 610 with block 620 (consisting of original instruction 605-6). Blocks 615 and 620 in this illustrative example are basic blocks, but, as noted below, it need not be so. For clarity, blocks 615 and 620 are referred to herein as "target blocks" of current hot block 610 because control flows to blocks 615 and 620 from current hot block 610.

Arc designator 520 identifies the starting and ending instructions of target blocks 615 and 620 in the same manner as employed by end-of-block identifier 360 for identifying the starting and ending instructions of hot blocks. That is, arc designator 520 scans the original instructions in original instruction storage area 201, starting with the target instruction or instructions to which control passes from the ending instruction of current hot block 610. Such target instructions in the illustrative example are original instructions 605-4 and 605-6. In the illustrated embodiment, the ending instruction is determined according to the two criteria described above: i.e., scanning until a jump instruction is encountered, or until a target instruction is encountered, whichever occurs first. As described above with respect to end-of-block identifier 360, arc designator 520 recognizes target instructions by comparing the unique identifier of each scanned original instruction with the target identifiers in stack 214, and with the unique identifiers in column 212A of look-up table 212 and their corresponding target instruction flags of column 212D. Thus, as explained above, the identified target blocks, such as 615 or 620, may consist of more than one basic block if a target instruction is not identified by either of the two criteria. In other embodiments, any other technique, now known or to be developed in the future, may be employed to identify the ending instructions of target blocks.

FIG. 6B also shows control flow into target block 625 (arc 603 from target block 615 and arc 604 from target block 620), which is referred to herein as a "second generation target block" of current hot block 610. That is, target block 625 is a target block of a target block of current hot block 610. It will be understood that additional control paths into current hot block 610 or any of its first or second generation target blocks may exist, but are not shown. In other embodiments, arc designator 520 may evaluate and record control flow into current hot block 610 in addition to, or instead of, evaluating control flow out of current hot block 610 as in the illustrated embodiment. It will be understood that, in other illustrative examples, a hot block or target block may contain a conditional jump instruction to multiple targets, typically referred to as a multi-way jump or switch instruction. In the present invention, such a switch instruction may be translated, in accordance with known techniques, as a cascade of two-way jump instructions.

In the illustrated embodiment, a modified form of "lazy" target identification is employed by arc designator 520. The type of modification is described below. The word "lazy" is used herein to indicate that identification of arcs from hot blocks to target blocks is deferred until it may be determined that the target blocks actually are to be executed. Advantageously, lazy target identification avoids the dedication of memory to record information about control flow paths that may never be encountered. Lazy target identification also avoids the expenditure of time to so identify all potential targets.

Such advantage is particularly important with respect to switch instructions. Although, as noted, switch instructions may be represented by a cascade of two-way jump instructions, the length of such cascade may be in the hundreds or thousands of instructions. Calculating and entering information about all such arcs to potential target blocks may, therefore, incur substantial costs with respect to computing time and memory usage. Moreover, it typically is not possible to determine all potential target blocks of a switch instruction prior to execution of the jump to the target blocks. The reason is that a switch instruction may execute a jump depending on the current values of one or more variables. For example, an index variable may determine to which of the thousands of target blocks control flows, and the value of the index variable may vary for each execution of the switch instruction. Lazy designation avoids such a problem by deferring the identification of target arcs until the target block is actually executed. The arc to such executed target block is referred to below as the "current target arc."

The modified form of lazy trace designation employed in the illustrated embodiment does not defer identification of target blocks of two-way jump instructions having a jump arc and a fall-through arc (referred to for convenience as "qualifying two-way jump instructions"). A jump arc refers to the passage of control through a jump instruction; a fall-through arc refers to the passage of control to the next sequential instruction. Such modification is often advantageous because: (a) the two possible target blocks of a qualified two-way jump instruction typically are capable of identification even though only one of them is the current target block; and (b) the time and memory resources required to store two records in table 222 are bounded, typically are not excessive, and may not be substantially greater than are consumed by implementing a "pure" form of lazy trace designation. If, however, one of the two target blocks of a qualified two-way jump instruction cannot be determined, significant time and/or memory resources may be saved, or for any other reason, the pure form of lazy trace designation process may be employed. That is, in such an embodiment, arc designator 520 only enters a record in table 222 for the current target block.

With respect to the illustrated embodiment of modified lazy trace designation, arc designator 520 analyzes the control flow described above by examining original instructions starting with the ending instruction of current hot block 610; i.e., instruction 605-3 (also shown as instruction 610-3). As will be evident to those skilled in the relevant art, if the condition of instruction 610-3 is satisfied, control passes from current hot block 610, through arc 602, to target block 620. Following a typical known syntax, if the condition is not satisfied, control falls through two-way jump instruction 610-3 to the next original instruction, which is instruction 605-4, shown in FIG. 6B as instruction 615-1. Arc designator 520 assesses such control flow by comparing the format, syntax, or other attribute of instruction 605-3 to a table of known attributes of original instructions, or by employing other techniques now known or to be determined in the future. Arc designator 520 therefore determines that, if the condition of the jump instruction 610-3 is met, the control flow out of current hot block 610 follows arc 602 to a target block having a starting instruction that is instruction 605-6. Alternatively, if the condition is not met, control falls through arc 601 to a target block having a starting instruction that is instruction 605-4. Thus, instruction 605-3 / 610-3 is the type of two-way jump instruction (a "qualified" two-way jump instruction) to which the modified lazy trace designation applies.

Arc designator 520 records current control-flow information in table 222, an illustrative portion of which is shown in FIG. 6D. Specifically, arc designator 520 designates a unique arc identifier, which in the illustrated embodiment is arbitrarily chosen, with respect to the current target arc through which control exits from current hot block 610. Because instruction 605-3/610-3 is a qualifying two-way jump instruction, arc designator 520 also designates a unique arc identifier with respect to the other arc through which control exists from current hot block 610. That is, in the illustrative example, control may exit from current hot block 610 through either jump arc 602 or fall-through arc 601. For illustrative purposes, it is assumed that the current target arc is fall-through arc 601, and that arc designator 520 designates such arc with the unique identifier "601." It is similarly assumed that arc designator 520 designates jump arc 602 with the unique identifier "602."

In the illustrated embodiment of hot block block-arc table 222, jump arc identifiers and fall-through arc identifiers are stored in the field of the appropriate record under columns 222B and 222E, respectively. Thus, with respect to the present illustrative example, arc designator 520 stores the arc identifier "601" in field 222E of record 1, as shown in FIG. 6D. Similarly, arc designator 520 also stores the arc identifier "602" in field 222B of record 1.

Arc designator 520 of the illustrated embodiment also stores a unique arc counter in table 222 for the current target arc, and, in the illustrated embodiment, initiates such counter to a predetermined integer value. As shown in FIG. 6D, such counters for jump arcs are stored in the appropriate record in the field represented by column 222C, and such counters for fall-through arcs are stored in the appropriate record in the field represented by column 222F. Thus, with respect to current arc 601, field 222F of record 1 for block 610 is initialized to contain the integer "500" for the jump arc counter corresponding to jump arc 602. (The integer "499" appears in FIG. 6D because it shows the counter after it has been decremented, as described below.) Such counters are used by hot trace selector 204 to identify hot traces, as described below.

Also, arc designator 520 records in the record for block 610 the unique identifier of the current target block of hot block 610. Thus, in the illustrative example, the unique identifier for fall-through arc target block 615 is stored in the field represented by column 222G. Such unique identifier in the illustrated embodiment is the representation of the address in original instruction storage area 201 of the starting instruction of such target block, which is represented in column 222G by "[605-4]." Similarly, in the illustrated embodiment of modified lazy target identification, arc designator 520 stores the unique identifier for jump arc target block 620 in the field represented by column 222D, which is "[605-6]."

In the illustrated embodiment, arc designator 520 also analyzes the control flow out of the current target block of current hot block 610. In alternative embodiments, such analysis may be deferred until control passes through such current target block. In the illustrated embodiment, arc 603 represents control flow out of instruction 605-5, also shown as instruction 615-2. As will be evident to those skilled in the relevant art, the instruction terminology "B label3" of instruction 615-2 represents an unconditional jump from instruction 615-2 to the target instruction at "label3," which is instruction 625-1. Arc 604 results from the noted typical syntactic rule that instructions are executed sequentially unless a jump occurs. If the jump instruction out of block 615 had been a conditional jump instruction, arc designator 520 would have analyzed the control flow out of block 615 only to the current target of block 615, i.e., the target indicated by the current values of the variables determining the jump condition.

Thus, in the illustrated embodiment, arc designator 520 determines control flow out of current hot block 610 to second, third, or further generations of target blocks. The number of generations so processed, if any, may be predetermined, or user-selected, based on any of a variety of factors, such as the amount of memory space available. With respect to the present illustrative example in which control flows through arc 603, arc designator 520 identifies control flow out of target block 625 (the second generation), but does not further process subsequent generations.

Arc designator 520 creates a record in table 222 for each such target block, if a record does not already exist. Arc designator 520 determines whether such a record already exists by comparing the unique identifier of the starting instruction of each target block with the entries in the fields represented in FIG. 6D by column 222A, or in accordance with any other technique now known or to be developed in the future. In the present example, it is assumed that there is no entry for block 615, uniquely identified by "[605-4]," and thus record 2 is generated, and the appropriate entries for columns 222A, 222B, 222C, and 222D of record 2 are entered. As noted, in alternative embodiments arc designator 520 may similarly create records in table 222 for one or more generations of preceding blocks of instructions through which control passes into current hot block 610.

Translator-instrumenter 530. Arc designator 520 passes control to translator-instrumenter 530, which translates the current hot block and instruments it for hot trace detection. As noted, FIG. 6C is an exemplary illustration of such translated instructions with hot trace detection. The instructions that implement the hot trace detection are referred to herein as instrumentation instructions. It will be understood by those skilled in the relevant art that the exemplary instructions of FIG. 6C are one of many possible translations and instrumentations that may be created using known techniques.

It will also be understood that, in other embodiments, translator-instrumenter 530 may translate instructions for purposes other than, or in addition to, such instrumentation for hot trace detection. For example, techniques may be employed so that the translated instructions facilitate one or more of such functions as debugging, profiling, monitoring, or any other function for which translated instructions are now used or for which they may be used in the future. Descriptions of embodiments of such techniques are described in the U.S. Patent Application entitled "METHOD, APPARATUS, AND PRODUCT FOR DYNAMIC SOFTWARE CODE TRANSLATION SYSTEM," attorney docket number 10980332-1, naming as inventors James S. Mattson, Jr., William B. Buzbee, and Lacky V. Shah, assigned to the assignee of the present invention and filed concurrently herewith. Such concurrently filed application is hereby incorporated herein by reference in its entirety. It will also be understood that, in alternative embodiments, techniques other than those described in the present application with respect to the illustrated embodiment for instrumenting instructions to record control flow, now known or to be developed in the future, may be employed.

In the illustrative embodiment shown in FIG. 6C, translated instructions 630-1 and 630-2 replicate the corresponding original instructions 605-1 and 605-2 shown in FIG. 6A. The time and resources required to execute these two translated instructions typically are the same as the time and resources required to execute the corresponding original instructions. In contrast, as noted above, the time that would have been required to execute corresponding emulated instructions typically would have been many times greater than that of executing the original or translated instructions, and additional memory, registers, or other resources may typically have been required. Similarly, instruction 630-3 replicates instruction 610-3, except that the target of the conditional jump is translated from the entry point of block 620 to an entry point created by translator-instrumenter 530 in translation 630, such entry point labeled "my_label1." The reason for this change in the target of the jump is to enable translator-instrumenter 530 to insert instrumentation instructions at the address "my_label1" that apply to the situation in which the condition of instruction 630-3 is satisfied, i.e., in which control passes through jump arc 602.

It will be assumed for illustrative purposes that the condition of instruction 630-3 is not satisfied. Thus, the instrumentation instructions for fall-through arc 601 are executed. These instrumentation instructions are instructions 630-4 through 630-8. The terminology "PUSHF" of instruction 630-4 will be understood by those skilled in the relevant art to indicate that the status flags of processor 105 are saved so that, after the instrumentation instructions have been executed, the machine state values may be returned to the values they had before such execution.

In the illustrated embodiment, instruction 630-5 decrements by one the counter corresponding to arc 601, which, in the instruction 630-5, is labeled "arc_601_counter." As described above, such counter is stored in the record for block 610 of table 222 in the field for the fall-through arc counter of fall-through arc 601; i.e., in record 1 under column 222F. Thus, as a result of the execution of instruction 630-5 in this illustrative example, such counter is decremented from its initial value of "500" to a new value of "499." Such decremented value is therefore shown in FIG. 6D. In this illustrative example, the initial value of such counter is the start-trace threshold; thus such counter is referred to as the "arc counter." The value of the start-trace threshold in the illustrated embodiment is predetermined, and is the same for each type of arc and every type of jump instruction giving rise to an arc. In alternative embodiments, the value of the start-trace threshold may be user-selected, dynamically adjusted, or both, based on various factors such as the number or length of hot traces, the amount of memory available, or the amount of time expended in identifying and translating hot traces. In alternative embodiments the value of the start-trace threshold need not be the same for each type of arc, and need not be the same for every type of jump instruction.

As is evident, each time control passes through arc 601, the arc counter will similarly be decremented. After control has passed through arc 601 for the five-hundredth time, the condition of conditional jump instruction 630-6 will be satisfied. Instruction 630-6 specifies that jump will occur to the address labeled "threshold_arc_601" when the arc counter referenced in instruction 630-5 has reached zero ("BZ" represents "branch on zero"). If this conditional jump is not taken, instrumentation instruction 630-7 returns the status flags to their pre-instrumentation state. Instruction 630-8 replicates the sequential passing of control over the fall-through arc 601, but does so using an unconditional jump instruction. Such unconditional jump is required in order to jump over the instrumentation instructions 630-9 through 630-13 inserted by translator-instrumenter 530 to count the number of times that control passes through jump arc 602 in the same manner as described above with respect to fall-through arc 601.

In such manner, translator-instrumenter 530 creates complete translation and instrumentation instructions for hot block 610. That is, translated instructions are created replicating every corresponding original instruction, and instrumentation instructions are created allowing detection of the passage of control through each arc through which control passes out of current hot block 610. One implementation of such translated and instrumented instructions are shown as translated instructions 630.

Hot block memory manager 540. Translator-instrumenter 530 passes control to hot block memory manager 540. As noted, hot block memory manager 540 stores the translated and instrumented current hot block into hot block storage area 202 and selectively removes from storage area 202 those hot blocks that have become cold. It will be understood that, in alternative embodiments, memory manager 540 may be a function of backpatcher 208 rather than of hot block control-flow instrumenter 220. It will also be understood that memory management for translated hot blocks may be carried out by one memory manager rather than the separate managers separately described for clarity in this embodiment, and that such combined memory manager may be included in the functions of backpatcher 208.

Figure 7:
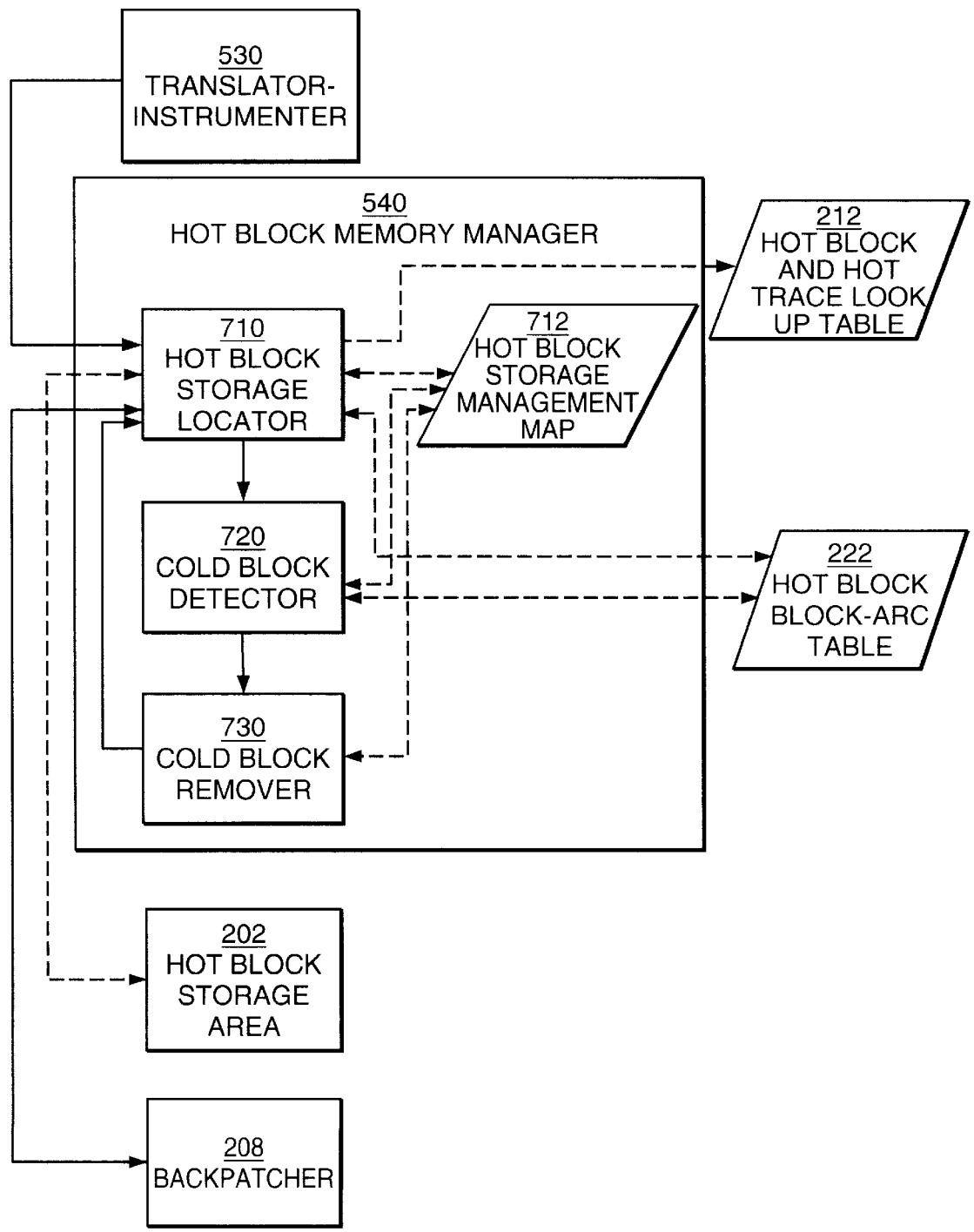
FIG. 7 is a functional block diagram of one embodiment of a hot block memory manager of the hot block control-flow instrumenter of FIG. 5.

FIG. 7 is a functional block diagram of one embodiment of hot block memory manager 540. Manager 540 includes hot block storage locator 710 that assigns space in hot block storage area 202 to store the current hot block, and stores the current hot block in such space. Manager 540 also includes cold block detector 720 that selectively determines if any translated hot block is no longer frequently executed. Manager 540 further includes cold block remover 730 that makes space in hot block storage area 202 that is occupied by infrequently executed hot blocks available to be used to store frequently executed hot blocks.

Hot Block Storage Locator 710.

In the illustrated embodiment, hot block storage locator 710 receives control from translator-instrumenter 530. The first time control so passes, storage locator 710 in one implementation of the illustrated embodiment determines a size and location in main memory 130 for hot block storage area 202. Typically, such size is established based on the size of main memory 130; the amount of main memory 130 that is dedicated to other uses, such as the execution of other programs; the size of executable file 170; and other factors that will be evident to those skilled in the relevant art. Having established the size and location of hot block storage area 202, storage locator 710 creates hot block storage management map 712. Map 712 is a data file in which is recorded, in accordance with known techniques, the usage of memory locations in hot block storage area 202.

With reference to the exemplary description of the processing of current hot block 610, storage locator 710 consults map 712 to locate a contiguous sequence of unused memory locations in hot block storage area 202 large enough in which to store translated instructions 630. It will be understood that, in alternative embodiments, non-contiguous areas may be selected for such storage if jump instructions are added in a known manner to patch together non-contiguous instructions. If there is sufficient room in hot block storage area 202, the instructions are stored and storage locator 710 records such usage of memory locations in map 712.

Storage locator 710 also updates look-up table 212, shown in FIG. 8, to correlate the address in original instruction area 201 of original instructions with the address in hot block storage area 202 of corresponding translated instructions. Specifically, storage locator 710 consults hot block block-arc table 222, shown in FIG. 6D, to determine the address of the starting original instruction of current hot block 610, and creates a record in look-up table 212 for such starting instruction. Storage locator 710 places in each such record a representation of the address in original instruction storage area 201 of such starting original instruction. Such entries are stored in the fields represented by column 212A. Thus, field 212A of record 1 contains a representation of the address in original instruction storage area 201 of original instruction 605-1.

Storage locator 710 also places in record 1 the address in hot block storage area 202 of corresponding translated instructions 630. Such entry is stored in the field of record 1 represented by column 212B. Thus, field 212B of record 1 contains a representation of the address in hot block storage area 202 of translated instruction 630-1, which corresponds to the original instruction 605-1. The symbols "[630-1-HB]" are used for illustrative purposes to indicate such representation. Storage locator 710 then passes control to backpatcher 208.

Cold Block Detector 720.

If, however, storage locator 710 determines that there is insufficient space in hot block storage area 202 to store translated instructions 630, control passes to cold block detector 720. It will be understood that, in other embodiments, such passage of control may take place even though sufficient space is available; for example, if a threshold is established whereby cold blocks are removed if the usage of hot block storage area 202 exceeds a specified value, such as 80 percent. Cold block detector 720 scans hot block block-arc table 222 to determine if any translated instructions may be removed from hot block storage area 202, as described below.

Typically, translated instructions are identified for removal if the hot block from which the instructions were translated is no longer hot; i.e., the flow of control in executable file 170 has shifted so that the translated instructions are no longer frequently executed, as measured in accordance with the present invention. Such formerly frequently, and currently infrequently, encountered translated instructions are referred to herein as "cold blocks." In alternative embodiments, cold blocks may remain in hot block storage area 202. However, a disadvantage of such embodiments is that the amount of space required to store and retain all translated instructions may grow beyond the size initially allocated by storage locator 710, requiring either an additional allocation of space or other action, including termination of the execution of executable file 170.

Returning to the illustrated embodiment, cold block detector 720 determines whether a formerly hot block in hot block storage area 202 has become cold by scanning the arc counters in hot block block-arc table 222. As noted, such counters are decremented each time control passes through their corresponding arcs. Advantageously, such counters also are periodically incremented. In the illustrated embodiment, the frequency of such incrementing is based on the processing of original instructions by original instruction fetcher 430. That is, such counters are incremented after a predetermined number of original instructions have been processed by original instruction fetcher 430. For example, each of the counters may be incremented by one for every 50 original instructions that are processed by original instruction fetcher 430.

In an alternative embodiment, the frequency of such incrementing may be determined by counting, in any known manner, cycles of the clock of processor 105 (not shown). That is, such counters may be incremented after a predetermined number of such cycles have occurred. Any of a variety of other techniques now known, or to be developed in the future, may also be employed to periodically increment such counters after a predetermined period. In alternative embodiments, the frequency of such incrementing may be dynamically determined based on the amount of memory that is available in hot block storage area 202 or other factors.

In the illustrated embodiment, an arc is considered to have become cold if its corresponding arc counter has risen to or above a predetermined cold-block threshold, for example, "600." In such case, the target block of such cold arc is identified by cold block detector 720 so that the translated instructions corresponding to such target block may be considered for removal by cold block remover 730. Using any of a variety of known techniques, such as search and rank techniques, cold block detector 720 identifies for removal the target block of the arc having the highest arc counter.

In one aspect of the illustrated embodiment, cold block detector 720 examines translation storage management map 712 to determine how much space will be made available by the removal of such cold block from hot block storage area 202. Cold block detector 720 also identifies the next-coldest block, i.e., the block that is the target of the arc having the next-highest arc counter, and also determines how much space will be made available by its removal. This process advantageously continues until the total amount of space that will be made available by the removal of the coldest blocks passes a predetermined value, for example, equal to one-third of the size of hot block storage area 202. Thus, it typically will not be necessary to repeat the identification of cold blocks when the next group of translated instructions is added to hot block storage area 202. Rather, cold-block identification is deferred until a sufficient number of new translated instructions have been added so as to fill the space made available by the removal of the coldest blocks. Cold block detector 720 then passes control to cold block remover 730.

Cold Block Remover 730.

Cold block remover 730 changes hot block storage management map 712 so that the spaces occupied by the coldest blocks are indicated to be available. Cold block remover 730 then passes control to hot block storage locator 710 so that translated instructions 630 may be stored in the space made available by the removal of the coldest blocks. In so passing control, cold block remover 730 also passes information in a known manner to storage locator 710 to enable and employ backpatcher 208 to backpatch jump instructions having targets within the removed coldest blocks.

BACKPATCHER 208

Backpatcher 208 assumes control from hot block storage locator 710. Using any one of a variety of known techniques, such as search and compare techniques, backpatcher 208 searches hot block block-arc table 222 to determine if any previously translated hot block has a jump instruction that jumps to the block of original instructions from which translated instructions 630 were translated, i. e., current hot block 610 of the illustrative example. Such determination is made by examining the fields for each record represented by column 222D (identifying the jump arc target block) and by column 222G (identifying the fall-through arc target block). If the identifier for current hot block 610, which is represented in FIG. 6D as "[605-1]," appears in any such field of any record of table 222, then backpatcher 208 backpatches the block corresponding to such record. Such block is hereafter referred to as a "backpatched block."

Backpatcher 208 accomplishes such backpatching by noting in table 222 the original instruction address of the starting instruction of the backpatched block. Such information is contained in field 222A of the record for the backpatched block. Using any of a variety of known techniques, such as search and compare techniques, backpatcher 208 locates the record in table 212 having a unique identifier in the field represented by column 212A that matches the unique identifier contained in field 222A of the record for the backpatched block. That is, backpatcher 208 matches representations of the address in original instruction storage area 201 of the starting instruction of the backpatched block. Backpatcher 208 then notes the address in hot block storage area 202 of the translated instruction corresponding to such starting instruction, referred to hereafter as the "starting hot block address." Such address is contained in the field of the record for the backpatched block represented by column 212B. Backpatcher 208 then scans the translated instructions in hot block storage area 202, starting with the starting hot block address. If the starting address of the current hot block was found in a field under column 222D, indicating that the current hot block is a target of jump instruction from the backpatched block, backpatcher looks for a jump instruction that jumps to the starting address of the current hot block. If the starting address of the current hot block was found in a field under column 222G, indicating that the current hot block is a target of a fall-through instruction from the backpatched block, backpatcher looks for an instruction having the same address as the starting address of the current hot block.

In either case, such instruction in the backpatched block is then changed by backpatcher 208 so that its target instruction is no longer the starting instruction of the current hot block in original instruction storage area 201, but, rather, is the corresponding translated starting instruction of the current hot block in hot block storage area 202. This backpatch process is repeated for every translated block in hot block storage area 202 with respect to which the current hot block is a target.

Backpatcher 208 similarly backpatches translated instructions in hot trace storage area 203, described below in relation to hot trace optimizer and instrumenter 206. That is, backpatcher 208 examines a current hot trace, described below, to determine if previously translated hot blocks in hot block storage area 202 or hot traces in hot trace storage area 203 have jump instructions that jump to a target instruction within the current hot trace. If so, backpatcher 208 backpatches such jump instructions so that they jump to the current hot trace. However, rather than referring to column 212B to find the appropriate field in the appropriate record of table 212, backpatcher 208 refers to column 212C. As described below, column 212C represents fields into which are stored a representation of the address in hot trace storage area 203 of the translated instruction corresponding to the instruction in original instruction storage area 201 identified in the field represented by column 212A of the same record. Also, rather than referring to hot block block-arc table 222, backpatcher 208 refers to hot trace counter table 224.

Backpatcher 208 also backpatches all jump instructions in hot block storage area 202 or hot trace storage area 203 having a target instruction in any cold block that was removed by cold block remover 730, as described above. Storage locator 710 passes to backpatcher 208 the unique identifiers for the starting instructions of all such cold blocks, such unique identifiers having been passed to storage locator 710 by cold block remover 730. It will be understood that many other known techniques could be used in alternative embodiments for providing backpatcher 208 with such information. In the manner described above with respect to backpatching translated instructions that pass control to the current hot block, backpatcher 208 backpatches translated instructions that pass control to removed cold blocks. However, instead of backpatching a jump or fall-through instruction so that a target address in original instruction storage area 201 is replaced with the address of the corresponding translated instruction in hot block storage area 202, the reverse procedure is applied. That is, backpatcher 208 backpatches a jump or fall-through instruction so that a target address of a translated instruction in hot block storage area 202 is replaced with the address of the corresponding original instruction in original instruction storage area 201. In a similar manner, backpatcher 208 backpatches all jump instructions in hot block storage area 202 or hot trace storage area 203 having a target instruction in any cold trace that was removed by cold trace detector and remover 1220, as described below.

HOT TRACE SELECTOR 204

As noted, if control passes through an arc of a current hot block a number of times that is equal to a start-trace threshold, hot trace selector 204 is invoked to select a hot trace. Hot trace selector 204 includes in such hot trace the current hot block and also related hot blocks that have arc counters greater than a trace-inclusion threshold. As used herein, the word "related" refers to a relationship between a block from which a jump occurs and the block containing the target of such jump.

For example, it is assumed for illustrative purposes that the fall-through arc counter for current hot block 610 has been decremented to zero. That is, the arc counter shown as having the value "499" in field 222F of record 1 of hot block block-arc table 222 has been reduced to 0, indicating that control has flowed out of current hot block 610 to block 615 five hundred times. Hot trace selector 204 is therefore invoked, and current hot block 610 is designated as part of a hot trace, referred to hereafter as the "current hot trace."

Because there is only one arc through which control may pass out of block 615, the jump arc counter for that arc, arc 603 as shown in FIG. 6B, typically will also therefore have been decremented to zero. The value of such arc counter is specified by the value stored in field 222C of record 2 of table 222. However, if there had been a second arc (not shown) through which control might pass out of block 615, the value in field 222C of record 2 need not be zero, and typically would not be if control passed through such second arc. Thus, in general, the values of the arc counters for the target blocks of the current hot block vary depending on how control has passed out of the target blocks.

Hot trace selector 204 examines the jump arc counters of field 222C and the fall-through arc counters of field 222F for the record in table 222 corresponding to the current hot block. In the illustrated embodiment, each such arc counter is compared to a predetermined trace-inclusion threshold. The value of such threshold may be, for example, 200. If the value of an arc counter is equal to or less than the value of such threshold, the target block to which control is passed through the corresponding arc is designated as part of the hot trace. For clarity, such corresponding arc is hereafter referred to as an "input arc" of the target block, and its corresponding counter is referred to as an "input arc counter." Thus, if the jump arc counter in field 222C of record 1 has the value "100," and the fall-through arc counter in field 222F of record 1 has the value "400," hot trace selector 204 designates the target block of the jump arc, i.e., block 620, as part of the hot trace. This procedure typically is then repeated, except that instead of examining the jump and fall-through arc counters corresponding to current hot block 610, hot trace selector 204 examines the jump and fall-through arc counters corresponding to target block 620. Thus, a second generation target block (the target block of target block 620) may be designated as part of the hot trace if an input arc counter for such second generation target block has been decremented to or below the trace-inclusion threshold.

In the same manner, third and subsequent generation target blocks (all generations collectively referred to herein as "related" blocks) may be examined to determine if they should be included in the hot trace. In the illustrated embodiment, such process is carried out for related blocks until one of two conditions is met, whichever occurs first.

The first condition is that there is no record of a target block of a block designated to be in the hot trace that has an input arc counter less than or equal to the trace-inclusion threshold. Such a circumstance may occur for a variety of reasons. For example, a trace-inclusion threshold of 200 would not necessarily be reached, even if the input arc counter to a target block had reached 0, if the flow of control had evenly split between a jump arc and a fall-through arc out of the target block such that the counters of both arcs had been decremented only to a value of 250. Also, it may have been predetermined, or user-selected, that arc designator 520 not extend the storage of data into table 222 beyond the second generation. Unless the record for a third or subsequent generation target block was entered into table 222 because such block had independently become a hot block, no record for such block typically would have been entered into table 222. The second condition is that the trace does not exceed a maximum trace length that may advantageously be measured by the number of generations of target blocks included in the hot trace, the number of instructions in the trace, or other criteria.

Both the trace-inclusion threshold and the maximum trace length are predetermined in the illustrated embodiment. However, in alternative embodiments, they may be user-selected, dynamically adjusted, or both, based on various factors such as the number or length of hot traces, the amount of memory available, or the amount of time expended in identifying and translating hot traces. Also, any alternative statistical method may be employed in alternative embodiments to alter the manner in which hot traces are designated. For example, dynamic behavior resulting in a sum of arc counters above a threshold value may be used to designate a hot trace in one embodiment, whereas the computation of a statistical mean of counter values that is above a threshold value may be so used in another embodiment. In such embodiments, the contribution of arc counters to the statistical analysis may be weighted; that is, for example, a first generation arc counter may have a greater, or lesser, influence on the statistical analysis than a second generation arc counter.

Thus, hot trace selector 204 selects the current hot trace including, in the illustrated embodiment, the current hot block and selected blocks of subsequent generations of related blocks. In the illustrated embodiment, hot trace selector 204 identifies the selected current hot trace by examining the fields in hot block block-arc table 222 represented by column 222A for the records corresponding to the current hot block and selected related blocks. The data in such fields provides the address in original instruction storage area 201 of the starting addresses of the current hot block and selected related blocks. Such addresses are made available, in accordance with any of a variety of known techniques, to IR generator 910 and code generator and instrumenter 930 of hot trace optimizer and instrumenter 206. Such information is used, respectively, to create an intermediate representation of the current hot trace, and to enter into hot trace counter table 224 the addresses of original instructions corresponding to the starting instructions of the current hot trace. Such addresses are stored in a start instruction address field corresponding to each record of table 224. Such fields for the records in table 224 are referred to generally and collectively as start instruction address fields 224A, as shown in FIG. 11. Along with this trace-identifying information, hot trace selector 204 passes control to IR generator 910.

If the preceding operations do not result in the identification of a hot trace by hot trace selector 204, control typically is returned to original instruction processor 310 so that the original instructions corresponding to the instructions of the current hot block may be emulated by emulator 340, rather than translated by hot trace optimizer and instrumenter 206 as described below. Such failure to identify a hot trace may occur in some implementations, for example, if an instruction is encountered that cannot be translated (e.g., a switch instruction in some implementations). Another, non-limiting, example of a failure to identify a hot trace may occur in some implementations if there is insufficient memory space to translate, otherwise process, or store a hot trace.

Also, as is well known to those skilled in the relevant art, the operations of designator 100 may be suspended or terminated by operating system 120 during the operations of hot trace selector 204, or of any other functional block of designator 100. For example, operating system 120 may determine that another software application, or system function, should supersede the operations of designator 100. In such a case, a system monitor function in any or all of the functional blocks of designator 100 (not shown) may cause control to pass to original instruction fetcher 430 so that it may retrieve the proxy data of proxy machine state 312. Execution interrupter and machine-state preserver 420 then returns control, via operating system 120, to processor 105, in a manner that is well known to those skilled in the relevant art.

HOT TRACE OPTIMIZER AND INSTRUMENTER 206

Hot trace optimizer and instrumenter 206 dynamically translates and optimizes hot traces that have been selected by selector 204, and stores them in hot trace storage area 203. Hot trace optimizer and instrumenter 206 also advantageously instruments hot traces so that control flow through them may be recorded to determine whether they have become cold.

Figure 9:
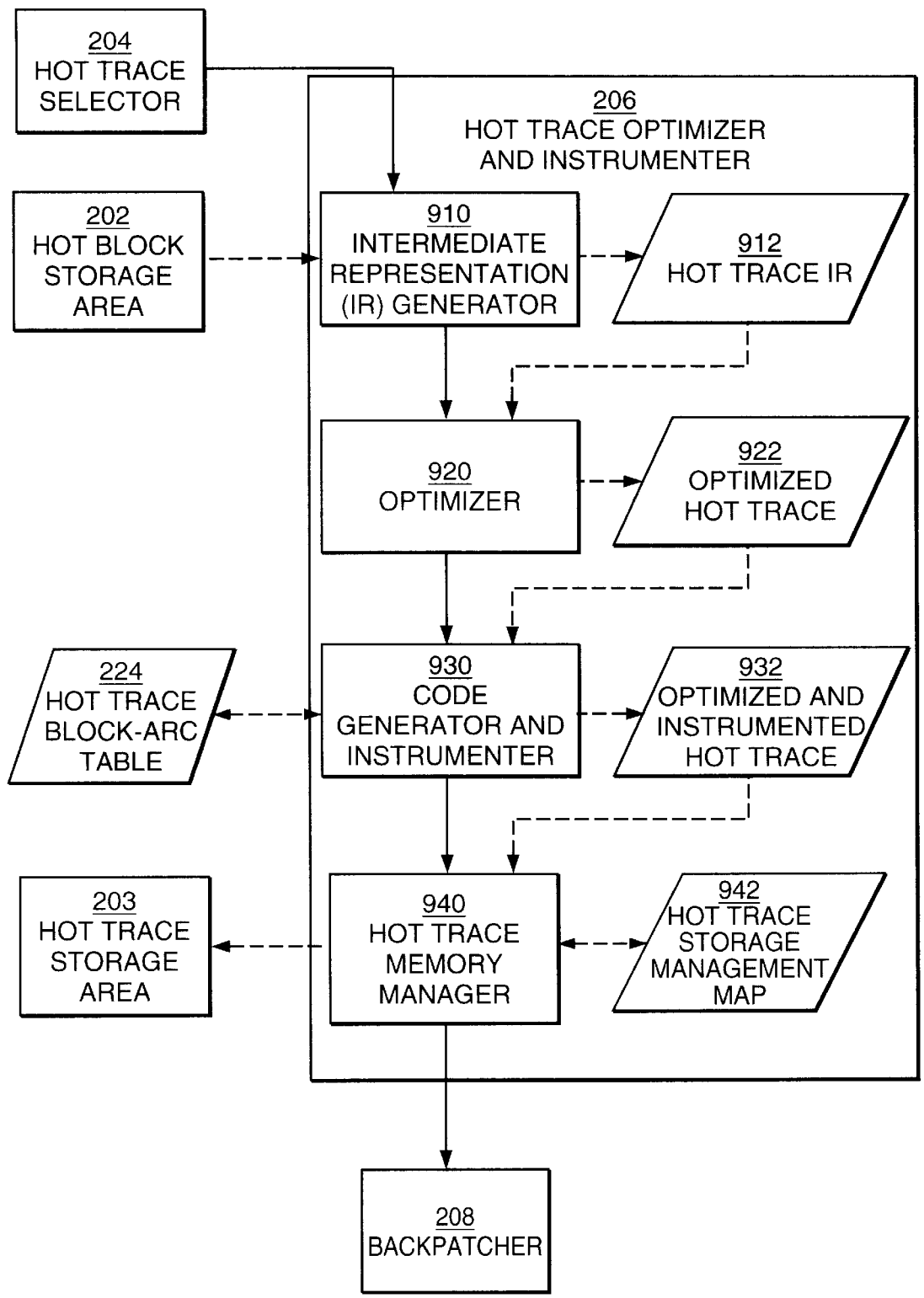
FIG. 9 is a functional block diagram of one embodiment of a hot trace optimizer and instrumenter of the control-path-evaluating trace designator of FIG. 2, including its input and output connections to other elements of the control-path-evaluating trace designator.

FIG. 9 is a functional block diagram of one embodiment of hot trace optimizer and instrumenter 206. Optimizer and instrumenter 206 includes intermediate representation (IR) generator 910 that generates an intermediate representation of the original instructions of the hot trace; optimizer 920 that dynamically optimizes the intermediate representation of the hot trace; code generator and instrumenter 930 that instruments the optimized hot trace so that control flow through it may be recorded to determine if it has become cold, and that also generates an optimized and instrumented hot trace; and hot trace memory manager 940 that stores the optimized and instrumented hot trace into hot trace storage area 203.

IR Generator 910

Employing the trace-identifying information made available to it by hot trace selector 204, IR generator 910 accesses the original instructions in original instruction storage area 201 corresponding to the translated instructions in hot block storage area 202 that make up the current hot trace. In accordance with any of a variety of known techniques, IR generator 910 generates hot trace IR 912 from such translated instructions. As is well known to those skilled in the relevant art, an intermediate representation is a representation of instructions in a form that is amenable to carrying out a variety of intermediate functions such as translation or optimization.

Optimizer 920

In accordance with any of a variety of known techniques, optimizer 920 dynamically optimizes hot trace IR 912. Such known techniques include, for example, loop unrolling, common subexpression elimination, copy propagation, and dead-code elimination. As noted, certain known optimization techniques advantageously may be applied, or applied with particular effect, at run time by a dynamic optimizer that generally could not be applied, or applied with the same effect, at compile time by a static optimizer. However, although such dynamic optimization typically is desirable, it need not be applied in alternative embodiments. In such alternative embodiments, optimized hot trace 922 therefore includes translated, but not optimized, instructions. References hereafter to "optimized" instructions or hot traces therefore will be understood to include such translated, but not optimized, instructions or hot traces in such alternative embodiments. Optimizer 920 passes control to code generator and instrumenter 930.

Code Generator and Instrumenter 930

As noted, code generator and instrumenter 930 instruments optimized hot trace 922 so that it may be determined if such hot trace has become cold. Code generator and instrumenter 930 also generates optimized and instrumented hot trace 932 for storage by hot trace memory manager 940 in hot trace storage area 203. Such instrumentation of the current hot trace is carried out in the illustrated embodiment generally in the same manner as described above with respect to the instrumentation of the current hot block by translator-instrumenter 530. That is, instrumentation instructions are inserted in the current hot trace to count occurrences of control flow through selected arcs. However, with respect to the cold-trace detection implemented by code generator and instrumenter 930 in the illustrated embodiment, only control flow out of the current hot trace is recorded. Thus, control flow between constituent blocks (i.e., the current hot block and related blocks) of the current hot trace are not recorded in the illustrated embodiment, although such counting may occur in alternative embodiments.

Specifically, in the illustrated embodiment, a counter is incremented for each occurrence of control flow out of the "nominal" exit of each hot trace. Such counters are referred to herein as nominal trace exit arc counters. Hot trace counter table 224, a portion of which is schematically shown in FIG. 11, is an exemplary data structure for storing such counters. Each row corresponds to entries in the fields of a particular record, wherein each record corresponds to one hot trace stored in hot trace storage area 203. In the illustrative example, record 1 corresponds to hot trace 932. Each record in table 224 of the illustrative implementation includes three fields, generally and collectively referred to as start instruction address fields 224A, nominal trace exit arc counter fields 224B, and alternative trace exit arc counter fields 224C. The contents of fields 224A, which are the unique identifiers of the addresses of the original instruction corresponding to the first instruction of the hot trace, have been described above. Such contents are schematically represented in fields 224A by a bracketed reference to the optimized instructions corresponding to the current hot block of the hot trace, with a dash and the letter "S" to indicate starting instruction (shown by "[1010-S]" of the illustrative example. It will be understood that the column labeled "row or trace record number" is included for clarity of reference only.

Figure 10:
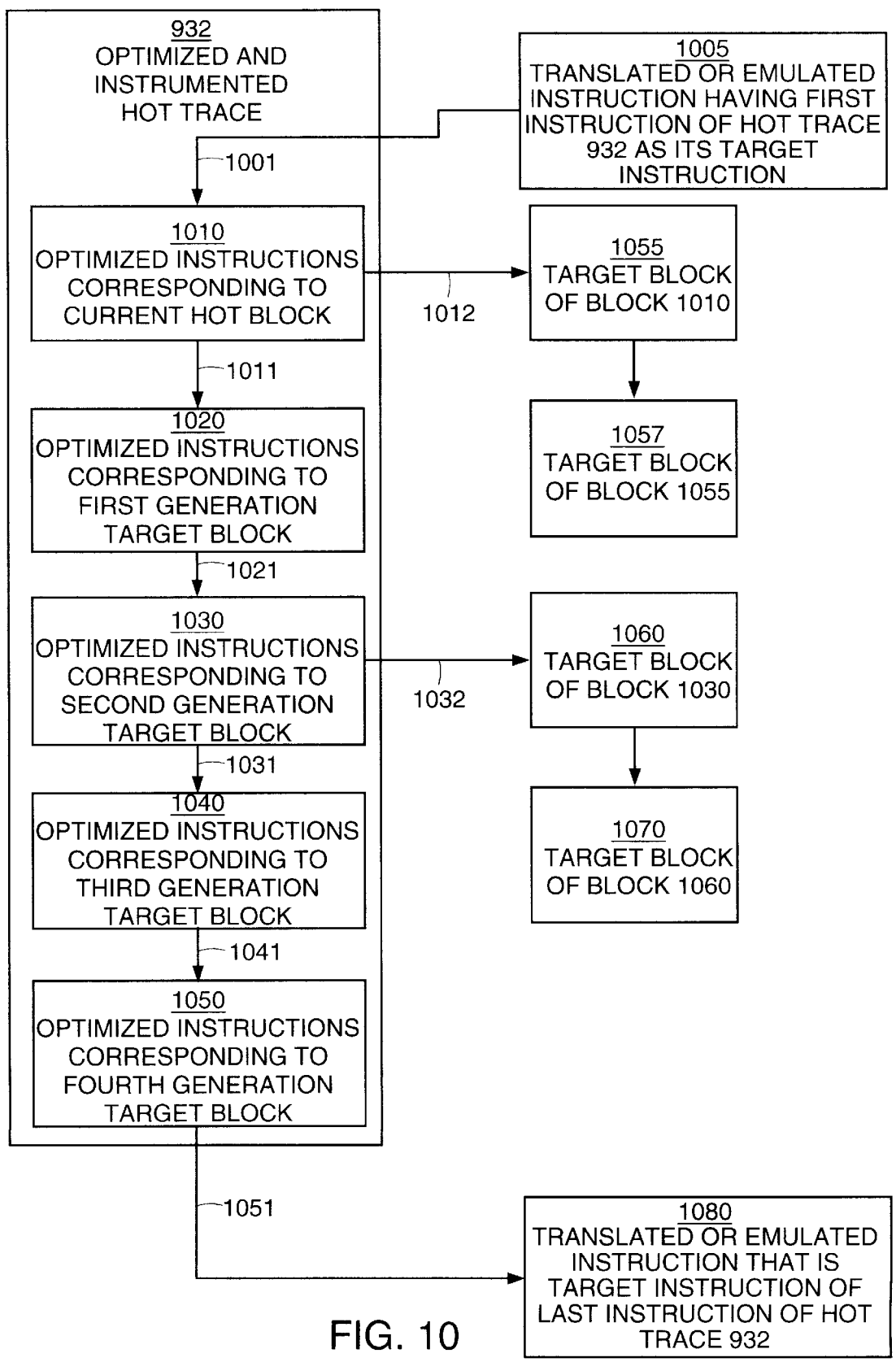
FIG. 10 is a graphical representation of an illustrative embodiment of a hot trace that has been optimized and instrumented in accordance with the hot trace optimizer and instrumenter of FIG. 9.

In table 224, the values of counters that record control flow out of the "nominal" exit of the hot trace are stored in nominal trace exit arc counter fields 224B. Referring to FIG. 10, the nominal exit of hot trace 932 is shown by line 1051. Such exit corresponds to the jump arc or fall through arc of the last generation of related blocks of the hot trace, depending on which of such arcs has the lowest arc counter in table 222 (indicating the greatest frequency of control flow). The counter associated with line 1051 is shown in FIG. 11 as the field 224B entry for record 1; i.e., the value "23,456." Such value, which is arbitrarily chosen for illustrative purposes, indicates that control has exited 23,456 times from the nominal exit of hot trace 932 since the hot trace was generated and the counter initialized to zero. As described above with respect to the arc counters of hot blocks in table 222, the hot trace counters of fields 224B (and of fields 224C, described below) are periodically decremented (whereas, in the illustrated embodiment, the counters of table 222 are incremented) by original instruction fetcher 430 so that a hot trace may become cold if it is not frequently executed. Thus, the value of an arc counter in fields 224B or 224C generally will decrease if the rate at which control passes through the corresponding arc of an optimized and instrumented hot trace is less than the rate at which such arc counter is incremented. As also noted with respect to cold block detector 720, the rate of incrementing the arc counters may, in alternative embodiments, be dynamically adjusted, rather than predetermined. In alternative embodiments, such periodic decrementing need not occur.

Another counter for each hot trace is also incremented for each occurrence of control flow out of the hot trace through an arc other than the one corresponding to the nominal exit. For example, referring to FIG. 10, code generator and instrumenter 930 instruments each constitutent block of hot trace 932 so that control flow from an arc leading out of hot trace 932 is detected. Such arcs are referred to for convenience herein as alternative trace exit arcs. An illustrative two of such arcs from hot trace 932, i.e., arcs 1012 and 1032, are shown in FIG. 10. It will be understood that other such alternative trace exit arcs may exist, but are not shown. It is assumed for illustrative purposes that the instrumentation code generated by code generator and instrumenter 930 detects 19,000 occurrences of control flow out of block 1030 through alternative trace exit arc 1032, and also detects 111 occurrences of control flow out of block 1010 through alternative trace exit arc 1012. In the illustrated embodiment, the sum of such occurrences (and of occurrences of control flow out of any other of the not-shown alternative trace exit arcs) is stored in fields 224C of table 224. Thus, field 224C of record 1 has the value "19,111." The operations of hot trace optimizer and instrumenter 206 with respect to the values in fields 224B and 224C are described below with respect to cold trace detector and remover 1220.

As was described above with respect to the instrumentation of hot blocks, it will be understood that, in other embodiments, code generator and instrumenter 930 may instrument, or otherwise translate, instructions for purposes other than, or in addition to, such instrumentation for cold trace detection. For example, techniques may be employed so that the translated instructions facilitate one or more of such functions as debugging, profiling, monitoring, or any other function for which translated instructions are now used or for which they may be used in the future. As noted above, some of such techniques are described in the U.S. Patent Application entitled "METHOD AND APPARATUS FOR DYNAMIC SOFTWARE CODE TRANSLATION SYSTEM," attorney docket number 10980332-1, naming as inventors James S. Mattson, Jr., William B. Buzbee, and Lacky V. Shah, assigned to the assignee of the present invention, filed concurrently herewith, and incorporated herein by reference in its entirety. It will also be understood that such instrumentation and/or translation for such alternative purposes may be done before or after the functions performed by any element of hot trace optimizer and instrumenter 206, and thus not necessarily performed by code generator and instrumenter 930.

For example, such alternative translation may be performed by IR generator 910 prior to optimization by optimizer 920.

Hot Trace Memory Manager 940

Hot trace memory manager 940 assumes control from code generator and instrumenter 930. As noted, hot trace memory manager 940 stores optimized and instrumented hot trace 932 into hot trace storage area 203 and selectively removes from storage area 203 those hot blocks that have become cold. It will be understood that, in alternative embodiments, memory manager 940 may be a function of backpatcher 208 rather than of hot trace optimizer and instrumenter 206. It will also be understood that, in alternative embodiments, memory management for hot blocks and hot traces may be carried out by one memory manager rather than the separate memory managers 540 and 940, respectively, described for clarity in this embodiment. It will also be understood that, in aspects of such alternative embodiments, such combined memory manager may be included in the functions of backpatcher 208.

Figure 12:
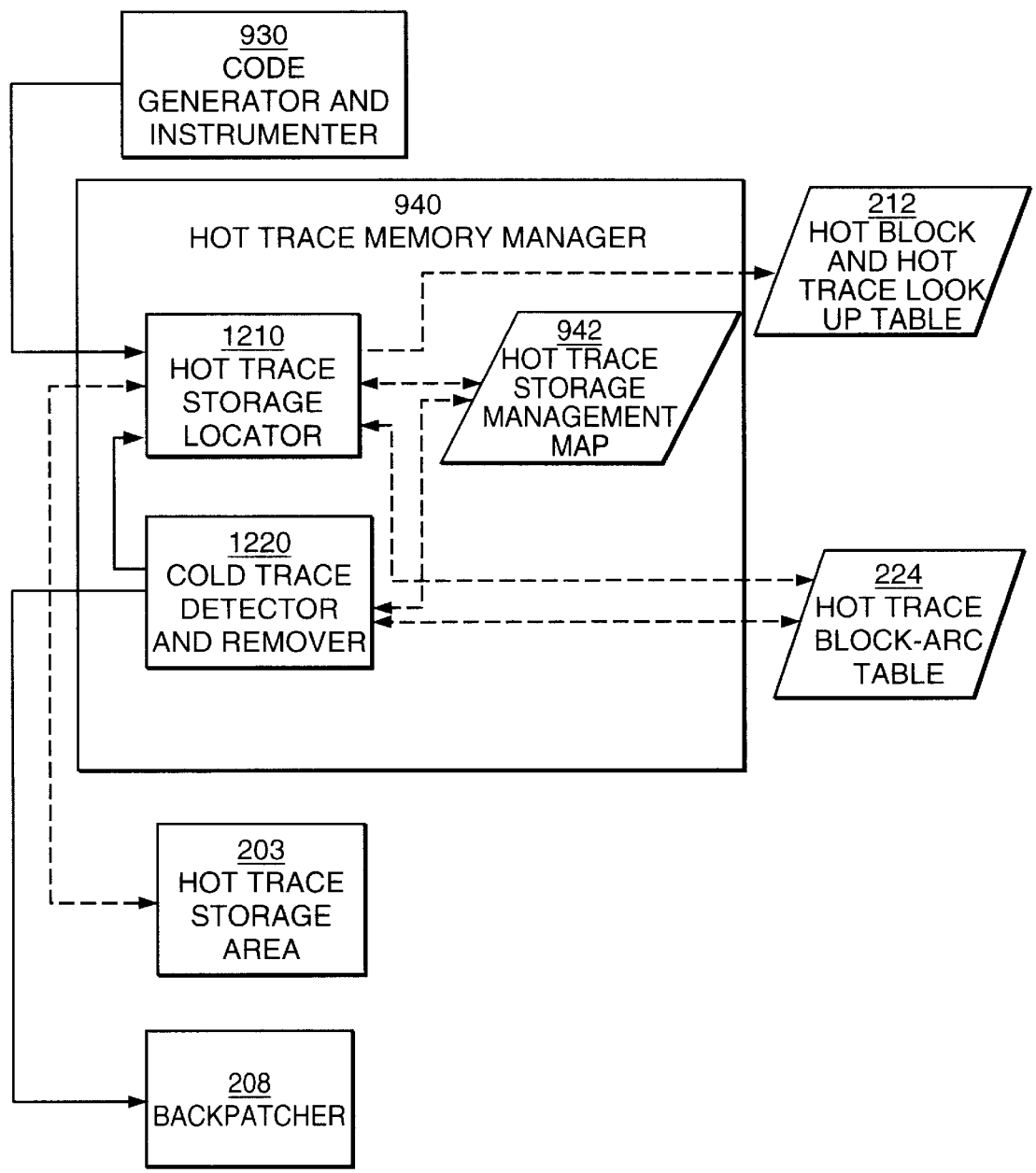
FIG. 12 is a functional block diagram of one embodiment of a hot trace memory manager of the hot trace optimizer and instrumenter of FIG. 9.

FIG. 12 is a functional block diagram of one embodiment of hot trace memory manager 940. Memory manager 940 includes hot trace storage locator 1210 that assigns space in hot trace storage area 203 to store the current hot trace, and stores the current hot trace in such space. Memory manager 940 also includes cold trace detector and remover 1220 that selectively determines if any translated hot trace is no longer frequently executed. Cold trace detector and remover 1220 also makes space in hot trace storage area 203 that is occupied by infrequently executed hot traces available to be used to store frequently executed hot traces.

Hot trace storage locator 1210. In the illustrated embodiment, hot trace storage locator 1210 receives control from code generator and instrumenter 930. The first time control so passes, storage locator 1210 in one implementation of the illustrated embodiment determines a size and location in main memory 130 for hot trace storage area 203. Typically, such size is established based on the size of main memory 130; the amount of main memory 130 that is dedicated to other uses, such as the execution of other programs; the size of executable file 170; and other factors that will be evident to those skilled in the relevant art. Having established the size and location of hot trace storage area 203, storage locator 1210 creates hot trace storage management map 1212. Map 1212 is a data file in which is recorded, in accordance with any of a variety of known techniques, the usage of memory locations in hot trace storage area 203.

With reference to the exemplary description of the processing of optimized and instrumented hot trace 932, storage locator 1210 consults map 1212 to locate a contiguous sequence of unused memory locations in hot trace storage area 203 large enough in which to store hot trace 932. It will be understood that, in alternative embodiments, non-contiguous areas may be selected for such storage if jump instructions are added in a known manner to patch together non-contiguous instructions. If there is sufficient space in hot trace storage area 203, locator 1210 stores the instructions and records such usage of memory locations in map 1212. In the illustrated embodiment, control is then passed to cold trace detector and remover 1220.

As will be described in greater detail below, cold trace detector and remover 1220 may be invoked to remove cold traces for either, or both, of two reasons: first, to provide that cold traces may be replaced with hot traces; and, second, if hot trace storage area 203 is becoming full (hereafter referred to as an "overflow" condition), to remove cold traces in order to accommodate the storage of additional hot traces. As noted, the term "cold trace" means that the flow of control in executable file 170 has shifted so that some or all of the constituent blocks of a formerly hot trace are no longer frequently executed, as indicated in accordance with the present invention. In the illustrated embodiment, cold trace detector and remover 1220 is invoked for the first reason irrespective of the amount of memory available in hot trace storage area 203. If there is an overflow condition, cold trace detector and remover 1220 further provides, as described below, that the amount of memory made available by removing cold traces for the first reason is sufficient to avoid frequent removal of cold traces for the second reason. Thus, locator 1210 advantageously indicates to cold trace detector and remover 1220 whether the overflow condition pertains. Any of a variety of known techniques may be used for this purpose. For example, locator 1210 in the illustrated embodiment sets an overflow flag (not shown) either to an overflow state to indicate that hot trace storage area 203 is becoming full, or a non-overflow state to indicate that it is not becoming full. In the illustrated embodiment, storage locator 1210 sets the overflow flag if the amount of memory available in hot trace storage area 203 has reached an overflow threshold. Such flag may be set even if there is room to store hot trace 932. For example, such overflow threshold may be reached when the amount of memory used in hot trace storage area 203 reaches 80 percent of its total capacity.

Storage locator 1210 also updates look-up table 212, shown in FIG. 8, to correlate the address in original instruction area 201 of original instructions with the addresses in hot trace storage area 203 of corresponding translated and optimized instructions. Specifically, storage locator 1210 consults field 224A of record 1 of hot trace counter table 224, shown in FIG. 11, to determine the addresses in original instruction storage area 201 of the original instructions corresponding to the starting instructions of hot trace 932. Storage locator 1210 searches the entries in the fields represented by the column 212A to find a match for such original instruction addresse. As noted, such original instruction addresse was stored in table 212 by hot block storage locator 710. Storage locator 1210 places a representation of the address in hot trace storage area 203 of the corresponding starting instruction of hot trace 932. Such entry is stored in the field represented by column 212C. Thus, in terms of the example of FIGS. 6A–6C, field 212C of record 1 contains a representation of the address in hot trace storage area 203 corresponding to original instruction 630-1 (symbolized by the term "[630-1-HT]"). It will be understood that, in alternative embodiments, hot trace counter table 222, hot trace counter table 224, and look-up table 212 may be combined into a single data structure or divided into multiple data structures, and that many variations in the storage of information as described above in such data structure or structures are possible. Storage locator 1210 then passes control to cold trace detector and remover 1220.

Cold trace detector and remover 1220. It is first assumed, for illustrative purposes, that storage locator 1210 has not set the overflow flag. In the illustrated embodiment, as noted, cold trace detector and remover 1220 nevertheless assumes control from hot trace storage locator 1210, even though there typically is sufficient space in hot trace storage area 203 to accommodate hot trace 932. Thus, cold trace detector and remover 1220 assumes control for the first reason noted above, i.e., to eliminate hot traces from hot trace storage area 203 that have become cold.

Such elimination of cold traces is advantageous because the execution of a hot trace that has become cold may result in slower execution than could be achieved by identifying a new hot trace having some of the same constituent blocks as the now cold trace. Also, because hot traces in some implementations of the illustrated embodiment are stored in quickly-accessed cache memory 140, a cold trace unproductively consumes this valuable memory resource. In one aspect of such unproductive use, backpatcher 208 may be required to generate multiple jumps in order to backpatch a jump from one hot trace, over a cold trace, to another hot trace. Such multiple jumps generally are required, for example, if the distance of the jump between such hot traces is greater than may be expressed in accordance with the instruction word architecture of processor 105; that is, if the instruction word length is not large enough to represent the direct jump distance. In such cases, an indirect jump to a register or memory location containing another address to which to jump may be implemented. Removing intervening cold traces may avoid the need for such indirect jump between hot traces located before and after the cold trace.

The operations of cold trace detector and remover 1220 with respect to the removal of cold traces are schematically represented by FIG. 10. It is assumed for illustrative purposes that hot trace 932 consists of constituent blocks 1010, 1020, 1030, 1040, and 1050, and their interconnecting arcs, 1011, 1021, 1031, and 1041. As noted, FIG. 10 also shows target blocks 1055 and 1060 that are not included in the current hot trace, but may receive control from constituent blocks 1010 and 1030, respectively. Also shown are blocks 1005 and 1080 that are not in hot trace 932. Control enters hot trace 932 through arc 1001 from a translated instruction (i. e., a jump or fall-through arc from a translated hot block or hot trace) or from an emulated instruction (generally represented by block 1005). Control nominally exits from hot trace 932 through arc nominal exit arc 1051 to a translated instruction, or an original instruction to be emulated, that is the target of such arc (generally represented by block 1080). Block 1060 receives control from block 1030 of hot trace 932 through arc 1032. Control passes out of block 1060 to its target, block 1070, through arc 1061, to a translated instruction (i e., a target instruction in a translated hot block or hot trace) or to a target instruction that has not been translated and is thus emulated by emulator 340.

Control flow during execution may shift such that hot trace 932 is no longer hot, and a different trace, consisting of the blocks 1010, 1020, 1060, and 1070, has become hot. (It is assumed for this illustration that hot trace 932 is not the current hot trace.) If cold trace detector and remover 1220 had not been invoked, then, as described below, time may be spent returning control to instruction fetcher 430, and possibly emulating the instructions of blocks 1060 and 1070. It typically is faster to translate, optimize, and execute a new hot trace consisting of blocks 1010, 1020, 1060, and 1070. For this, and the other reasons noted above with respect to conserving valuable memory resources, cold trace detector and remover 1220 therefore advantageously removes the cold trace including the blocks 1010, 1020, 1030, 1040, and 1050 so that it is not executed. Such removal is accomplished by changing map 1212, or in another known manner, as described below.

In the illustrated embodiment, blocks 1010, 1020, 1060, and 1070 are not concurrently identified as a new hot trace. Rather, because they are frequently executed, they typically will be identified as hot blocks by hot block manager 202, and then as a hot trace by hot trace selector 204. In alternative embodiments, such blocks may concurrently be identified as constituting a hot trace. That is, cold trace detector and remover 1220 may indicate to hot trace optimizer and instrumenter 206 that, without the need for further processing by hot block manager 202 and hot trace selector 204, such blocks constitute a hot trace.

Returning to the illustrated embodiment, cold trace detector and remover 1220 determines whether hot traces in hot trace storage area 203 have become cold by scanning the arc counters in hot trace counter table 224. As noted, such counters are incremented each time control passes through their corresponding arcs and, in the illustrated embodiment, such counters also are periodically decremented. A predetermined, or user-selected, value, threshold, formula, or other indicator typically is used to compare the counters in fields 224B and 224C of each record of table 224. In alternative embodiments, all such records need not be examined; for example, only the first fifty percent of those entered are examined.

In the illustrated embodiment, for each record cold trace detector and remover 1220 compares the value of alternative trace exit arc counter field 224C to the value of nominal trace exit are counter 224B. If the value in field 224C of a particular record equals or exceeds the value in field 224B of that record, the hot trace corresponding to such record is determined to have become a cold trace. In one implementation of such embodiment, however, such determination may be tentative; for example, a grace period may be applied during which the hot trace remains hot but will be considered cold if reevaluation continues to indicate that it is cold after the grace period. Also in one implementation, the cold-trace determination (whether tentative or not) may be made if the value in field 224C is less than the value in field 224B, but the difference between the two values is less than a cold-trace determination threshold. Such theshold may be a numerical value, a percentage of the value in either field 224B or 224C, or a formula. Both the value or method of calculating the cold-trace determination threshold may be predetermined, user-selected, or a combination thereof. Also, in the illustrated embodiment, cold trace detector and remover 1220 advantageously reinitializes (e.g., to a zero value) the values in fields 224B and 224C of the records that it has examined. Such reinitialization enables cold trace detector and remover 1220 to make its comparisons based on recent control flow rather than being biased by a long history of control flow, the nature of which may have recently changed but not be apparent in the longer-term perspective. Also, the possibility that the values in either of such fields may exceed the capacity of the chosen data structure to represent is reduced by reinitialization.

In the illustrated embodiment, it is arbitrarily assumed for illustrative purposes that a trace is considered to have become cold if its alternative trace exit arc counter reaches a value that exceeds 50% of the value of its nominal trace exit arc counter. It is also assumed for illustrative purposes that there is no grace period. Thus, the hot trace corresponding to record 1 of table 224 (assumed for illustrative purposes to be hot trace 932) is determined to have become a cold trace. Even though blocks 1010, 1020, and 1030 may remain frequently executed, it typically is advantageous to designate hot trace 932 to be a cold trace. Else, when original instruction fetcher 430 transfers control to hot trace 932 for execution, arcs 1012 or 1032 typically will transfer control out of hot trace 932 and back to fetcher 430.

In some cases, such return of control to fetcher 430 will not occur due to the backpatching of the jump instruction giving rise to arcs 1012 or 1032. As noted, such backpatching is carried out if, in terms of the illustrative example, the original instructions corresponding to blocks 1055 or 1060 have been identified as frequently executed, identified as hot blocks, translated, and stored in hot block storage area 202. Also, such hot blocks may have been identified as part of a hot trace other than hot trace 932, optimized, and stored in hot trace storage area 203. In some alternative embodiments, therefore, a hot trace that has become cold may remain in hot trace storage area 203 if the shift of control is to another hot trace, or, in some aspects of such alternative embodiments, a hot block. However, such alternative embodiments may not be desirable because of the additional space in hot trace storage area 203 required to store infrequently executed constituent blocks of a hot trace, and for other reasons (such as constraints imposed by instruction word architecture) as noted above.

Cold trace detector and remover 1220 typically carries out such evaluation for all hot traces in hot trace storage area 203. In accordance with any of a variety of known techniques, cold trace detector and remover 1220 updates translation storage management map 1212 so that space occupied by cold traces is indicated to be available, or otherwise removes cold traces from hot trace storage area 203. Also, cold trace detector and remover 1220 records the amount of space that thus has been made available. As noted, in alternative embodiments, only a portion or hot traces may be so evaluated. For example, only a portion starting with those hot traces that are stored in a specified portion of hot trace storage area 203, or in accordance with any other criteria, such as the length of time that traces have been so stored. Also, in alternative embodiments, cold trace detector and remover 1220 may only be invoked if the overflow flag has been set.

It is now assumed for illustrative purposes that storage locator 1210 has set the overflow flag. If the amount of memory made available by the elimination of cold traces, as described above, has been sufficient to reduce the amount of memory used in hot trace storage area 203 below the overflow threshold, cold trace detector and remover 1220 need not further identify cold traces for removal.

If the amount of memory used by hot traces in hot trace storage area 203 remains above the overflow threshold, which is 80 percent in the illustrative example, cold trace detector and remover 1220 continues identifying cold traces and removing them in the manner described above. That is, in the illustrated embodiment, cold trace detector and remover 1220 identifies traces having alternative trace exit arc counters that are less than 50 percent of their corresponding nominal trace exit arc counters; for example, such ratio is 45 percent. This process may be repeated until the total amount of space that is made available by the removal of the coldest traces passes a predetermined usage threshold (not shown), for example, equal to one-third of the size of hot trace storage area 203. Cold trace detector and remover 1220 modifies map 1212 to record all such reallocations or other forms of removal of cold traces.

Thus, in such aspect of the illustrated embodiment, it typically will not be necessary to repeat the identification of cold traces when the next hot trace is added to hot trace storage area 203. Rather, cold-trace identification may be deferred until a sufficient number of hot traces have been added so as to fill the space made available by the removal of the coldest traces. In another aspect of the illustrated embodiment, the removal of cold traces may be based only on the amount of space available in hot trace storage area 203 and not on a hot trace becoming less frequently executed. That is, a hot trace that has become cold will remain in hot trace storage area 203 unless and until a usage threshold has been reached. In alternative embodiments, cold traces may remain in hot trace storage area 203. However, a disadvantage of such embodiments is that the amount of space required to store and retain all hot traces may grow beyond the size initially allocated by storage locator 1210, requiring either an additional allocation of space or other action, including termination of the execution of executable file 170.

If the overflow flag is set, cold trace detector and remover 1220 resets the flag to indicate that the overflow condition has been corrected, and passes control back to hot trace storage locator 1210 so that it may locate space in hot trace storage area 203 in which to store the current hot trace. If the overflow flag is not set, cold trace detector and remover 1220 passes control to backpatcher 208 that backpatch jump instructions having targets within the removed cold traces, as described above. That is, backpatcher 208 examines current hot trace 932 to determine if previously translated hot blocks or hot traces have jump instructions that jump to a target instruction within it. If so, backpatcher 208 backpatches such jump instructions so that they jump to such target instruction in hot trace 932.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. The functions of any module may be carried out in various ways in alternative embodiments. In particular, numerous variations are contemplated in accordance with the present invention to identify hot traces, record control flow through hot traces, select hot traces including hot traces, detect changes in control flow that render formerly hot traces cold, and to eliminate cold traces.

Also, there are many possible variations of the architecture for the data structures described above, including hot trace and hot trace look-up table 212, hot block block-arc table 222, and hot trace counter table 224. It will be evident to those skilled in the relevant art that such, and other, data structures may be stored in main memory 130, or one or more could be stored in cache memory 140, memory storage device 150, or another device for storing data. As will be evident to those skilled in the relevant art, the values in data structures generally are initialized or re-initialized in accordance with any of a variety of known techniques to provide that such values are accurate. Such initializations or re-initializations of data structures therefore are assumed, but may not be further described, for the various data structures, including flags, of the illustrated embodiment or alternative embodiments.

In addition, it will be understood by those skilled in the relevant art that control and data flows between and among functional modules of the invention and various data structures may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various described data structures may be combined; the sequencing of functions or portions of functions generally may be altered; and so on. As an additional, non-limiting, example, control flow to and from original instruction fetcher 430 from various functional modules may, in alternative embodiments, be accomplished directly between or among such functional modules without the involvement of fetcher 430. Also, for example, all or some of the functions described with respect to end-of-trace identifier 360 could, in alternative embodiments, be performed by hot trace control-flow instrumenter, and vice versa. Numerous other embodiments, and modifications thereof, are contemplated as falling within the scope of the present invention as defined by appended claims and equivalents thereto.

What is claimed is:

1. A computer system having at least one central processing unit (CPU), at least one memory unit having stored therein a plurality of original instructions of an executable file, and a control-path-evaluating-trace-designator, wherein:

the control-path-evaluating-trace-designator cooperates with the at least one CPU to dynamically designate at least one sequence of the plurality of original instructions to be a hot trace, if present, upon a first plurality of occurrences of control flow through the at least one sequence of the plurality of original instructions reaching a hot-trace-designation threshold.

2. The computer system of claim 1, wherein:

the hot-trace-designation threshold is a rate at which the first plurality of occurrences of control flow occurs.

3. The computer system of claim 1, wherein:

the hot-trace-designation threshold is a magnitude of the first plurality of occurrences of control flow.

4. The computer system of claim 1, wherein:

the hot-trace-designation threshold is predetermined.

5. The computer system of claim 1, wherein:

the hot-trace-designation threshold is dynamically adjusted.

6. The computer system of claim 1, wherein:
the control-path-evaluating-trace-designator further dynamically translates the hot trace, if present.

7. The computer system of claim 6, wherein:
the control-path-evaluating-trace-designator further dynamically optimizes the translated hot trace, if present.

8. The computer system of claim 6, wherein:
the control-path-evaluating-trace-designator further dynamically removes the translated hot trace, if present, upon a second plurality of occurrences of control flow through the translated hot trace reaching a cold-trace-designation threshold.

9. The computer system of claim 8, wherein:
the cold-trace-designation threshold is a rate at which the second plurality of occurrences of control flow occurs.

10. The computer system of claim 8, wherein:
the cold-trace-designation threshold is a magnitude of the second plurality of occurrences of control flow.

11. The computer system of claim 8, wherein:
the cold-trace-designation threshold is predetermined.

12. The computer system of claim 8, wherein:
the cold-trace-designation threshold is dynamically adjusted.

13. A computer system having at least one central processing unit (CPU) and at least one memory unit having stored therein a plurality of original instructions of an executable file, and also having stored therein a set of control-path-evaluating-trace-designator instructions for execution by the at least one CPU, the control-path-evaluating-trace-designator instructions designating, when so executed, at least one hot trace in the original instructions, the set of control-path-evaluating-trace-designator instructions comprising:
  (1) a set of hot-block manager instructions that, when executed by the at least one CPU,
    (a) identifies a plurality of blocks of the plurality of original instructions as hot locks upon a first plurality of occurrences of control through each of the blocks reaching a start instruction frequency threshold, and
    (b) translates and instruments the hot blocks to record occurrences of control flow through them; and
  (2) a set of hot trace selector instructions that, when executed by the at least one CPU, selects at least one hot trace, if present, comprising:
    (a) a first hot block of the plurality of hot blocks upon a second plurality of occurrences of control through the first block reaching a start-trace threshold, and
    (b) at least a second hot block related to the first hot block upon a third plurality of occurrences of control through the second hot block reaching a trace-inclusion threshold.

14. The computer system of claim 13, further comprising an operating system, and
wherein the set of control-path-evaluating-trace-designator instructions is executed by the at least one CPU in cooperation with the operating system.

15. The computer system of claim 13, wherein:
the start-trace threshold is a rate at which the second plurality of occurrences of control flow occurs.

16. The computer system of claim 13, wherein:
the start-trace threshold is a magnitude of the second plurality of occurrences of control flow.

17. The computer system of claim 13, wherein:
the start-trace threshold is predetermined.

18. The computer system of claim 13, wherein:
the start-trace threshold is dynamically adjusted.

19. The computer system of claim 13, wherein the set of hot block manager instructions further:
  (c) removes at least a third hot block, if present, upon a fourth plurality of occurrences of control flow through the third hot block reaching a cold-block threshold.

20. The computer system of claim 13, wherein the set of control-path-evaluating-trace-designator instructions further comprises:
  (3) a set of backpatcher instructions that:
    (a) determines if a first translated hot block comprises at least one target instruction that is a target of at least one translated jump instruction that is included in any one of the plurality of translated hot blocks;
    (b) if so, backpatches the translated jump instruction so that control is directed through it to the target instruction.

21. The computer system of claim 13, wherein the set of control-path-evaluating-trace-designator instructions further comprises:
  (3) a set of hot trace optimizer and instrumenter instructions that:
    (a) dynamically translates at least a first hot trace of the at least one hot trace.

22. The computer system of claim 21, wherein the set of hot trace optimizer and instrumenter instructions further:
  (b) instruments the first hot trace to record occurrences of control flow through it.

23. The computer system of claim 22, wherein the set of hot trace optimizer and instrumenter instructions further:
  (c) dynamically optimizes the translated and instrumented first hot trace.

24. The computer system of claim 22, wherein the set of hot trace optimizer and instrumenter instructions further:
  (c) selectively removes at least a second hot trace of the at least one hot trace, if present, upon a fourth plurality of occurrences of control flow through the second hot trace reaching a cold-trace threshold.

25. The computer system of claim 21, wherein the set of hot trace optimizer and instrumenter instructions further:
  (b) dynamically optimizes the translated first hot trace.

26. The computer system of claim 21, wherein the set of control-path-evaluating-trace-designator instructions further comprises:
  (4) a set of backpatcher instructions that:
    (a) determines if the first hot trace comprises at least one target instruction that is a target of at least one translated jump instruction;
    (b) if so, backpatches the translated jump instruction so that control is directed through it to the target instruction.

27. The computer system of claim 26, wherein:
the translated jump instruction is included in any one of the plurality of translated hot blocks.

28. The computer system of claim 26, wherein:
the translated jump instruction is included in a translated third hot trace of the at least one hot trace.

29. The computer system of claim 21, wherein the set of control-path-evaluating-trace-designator instructions further comprises:
  (4) a set of emulator instructions that emulates at least one of the plurality of original instructions, if present, that is not included in any of the translated at least a first hot trace.

30. The computer system of claim 13, wherein the set of control-path-evaluating-trace-designator instructions further comprises:
(3) a set of emulator instructions that emulates at least one of the plurality of original instructions, if present, that is not included in any of the plurality of translated hot blocks.

31. A computer system having at least one central processing unit (CPU), at least one memory unit having stored therein a plurality of original instructions of an executable file, and a control-path-evaluating trace designator configured to cooperate with the at least one CPU to designate at least one hot trace in the original instructions, the control-path-evaluating trace designator comprising:
(1) a hot block manager that
  (a) identifies a plurality of blocks of the plurality of original instructions as hot blocks upon a first plurality of occurrences of control through each of the blocks reaching a start-instruction frequency threshold, and
  (b) translates and instruments the hot blocks to record occurrences of control flow through them; and
(2) a hot trace selector that selects at least one hot trace, if present, comprising:
  (a) a first hot block of the plurality of hot blocks upon a second plurality of occurrences of control through the first block reaching a start-trace threshold, and
  (b) at least a second hot block related to the first hot block upon a third plurality of occurrences of control through the second hot block reaching a trace-inclusion threshold.

32. The computer system of claim 31, further comprising an operating system, and
wherein the control-path-evaluating trace designator cooperates with the operating system.

33. The computer system of claim 31, wherein:
the start-trace threshold is a rate at which the second plurality of occurrences of control flow occurs.

34. The computer system of claim 31, wherein:
the start-trace threshold is a magnitude of the second plurality of occurrences of control flow.

35. The computer system of claim 31, wherein:
the start-trace threshold is predetermined.

36. The computer system of claim 31, wherein:
the start-trace threshold is dynamically adjusted.

37. The computer system of claim 31, wherein the hot block manager further:
(c) removes at least a third hot block, if present, upon a fourth plurality of occurrences of control flow through the third hot block reaching a cold-block threshold.

38. The computer system of claim 31, wherein the control-path-evaluating trace designator further comprises:
(3) a backpatcher that:
  (a) determines if a first translated hot block comprises at least one target instruction that is a target of at least one translated jump instruction that is included in any one of the plurality of translated hot blocks;
  (b) if so, backpatches the translated jump instruction so that control is directed through it to the target instruction.

39. The computer system of claim 31, wherein the control-path-evaluating trace designator further comprises:
(3) a hot trace optimizer and instrumenter that:
  (a) dynamically translates at least a first hot trace of the at least one hot trace.

40. The computer system of claim 39, wherein the hot trace optimizer and instrumenter further:
(b) instruments the first hot trace to record occurrences of control flow through it.

41. The computer system of claim 40, wherein the hot trace optimizer and instrumenter further:
(c) dynamically optimizes the translated and instrumented first hot trace.

42. The computer system of claim 40, wherein the hot trace optimizer and instrumenter further:
(c) selectively removes at least a second hot trace of the at least one hot trace, if present, upon a fourth plurality of occurrences of control flow through the second hot trace reaching a cold-trace threshold.

43. The computer system of claim 39, wherein the hot trace optimizer and instrumenter further:
(b) dynamically optimizes the translated first hot trace.

44. The computer system of claim 39, wherein the control-path-evaluating trace designator further comprises:
(4) a set of backpatcher instructions that:
  (a) determines if the first hot trace comprises at least one target instruction that is a target of at least one translated jump instruction;
  (b) if so, backpatches the translated jump instruction so that control is directed through it to the target instruction.

45. The computer system of claim 44, wherein:
the translated jump instruction is included in any one of the plurality of translated hot blocks.

46. The computer system of claim 44, wherein:
the translated jump instruction is included in a translated third hot trace of the at least one hot trace.

47. The computer system of claim 39, wherein the control-path-evaluating trace designator further comprises:
(4) a set of emulator instructions that emulates at least one of the plurality of original instructions, if present, that is not included in any of the translated at least a first hot trace.

48. The computer system of claim 31, wherein the control-path-evaluating trace designator further comprises:
(3) an emulator that emulates at least one of the plurality of original instructions, if present, that is not included in any of the plurality of translated hot blocks.

49. A computer-implemented method for designating from a plurality of original instructions of an executable file at least one hot trace, the method comprising the steps of:
(1) identifying a plurality of blocks of the plurality of original instructions as hot blocks upon a first plurality of occurrences of control through each of the blocks reaching a start-instruction frequency threshold;
(2) translating and instrumenting the hot blocks to record occurrences of control flow through them; and
(3) selecting at least one hot trace, if present, comprising:
  (a) a first hot block of the plurality of hot blocks upon a second plurality of occurrences of control through the first block reaching a start-trace threshold, and
  (b) at least a second hot block related to the first hot block upon a third plurality of occurrences of control through the second hot block reaching a trace-inclusion threshold.

50. The method of claim 49, wherein:
the start-trace threshold is a rate at which the second plurality of occurrences of control flow occurs.

51. The method of claim 49, wherein:
the start-trace threshold is a magnitude of the second plurality of occurrences of control flow.

52. The method of claim 49, wherein:

the start-trace threshold is predetermined.

53. The method of claim 49, wherein:

the start-trace threshold is dynamically adjusted.

54. The method of claim 49, further comprising the step of:

(4) removing at least a third hot block, if present, upon a fourth plurality of occurrences of control flow through the third hot block reaching a cold-block threshold.

55. The method of claim 49, further comprising the step of:

(4) determining if a first translated hot block comprises at least one target instruction that is a target of at least one translated jump instruction that is included in any one of the plurality of translated hot blocks; and (5) if so, backpatching the translated jump instruction so that control is directed through it to the target instruction.

56. The method of claim 49, further comprising the step of:

(4) dynamically translating at least a first hot trace of the at least one hot trace.

57. The method of claim 56, further comprising the step of:

(5) instrumenting the first hot trace to record occurrences of control flow through it.

58. The method of claim 57, further comprising the step of:

(6) dynamnically optimizing the translated and instrumented first hot trace.

59. The method of claim 57, further comprising the step of:

(6) selectively removing at least a second hot trace of the at least one hot trace, if present, upon a fourth plurality of occurrences of control flow through the second hot trace reaching a cold-trace threshold.

60. The method of claim 56, further comprising the step of:

(5) dynamically optimizing the translated first hot trace.

61. The method of claim 56, further comprising the steps of:

(5) determining if the first hot trace comprises at least one target instruction that is a target of at least one translated jump instruction; and (6) if so, backpatching the translated jump instruction so that control is directed through it to the target instruction.

62. The method of claim 61, wherein:

the translated jump instruction is included in any one of the plurality of translated hot blocks.

63. The method of claim 61, wherein:

the translated jump instruction is included in a translated third hot trace of the at least one hot trace.

64. The method of claim 56, further comprising the step of:

(5) emulating at least one of the plurality of original instructions, if present, that is not included in any of the translated at least a first hot trace.

65. The method of claim 49, further comprising the step of:

(4) emulating at least one of the plurality of original instructions, if present, that is not included in any of the plurality of translated hot blocks.

66. Storage media that contains software that, when executed on an appropriate computing system having at least one central processing unit (CPU) and at least one memory unit having stored therein a plurality of original instructions of an executable file, performs a method comprising the steps of:

(1) identifying a plurality of blocks of the plurality of original instructions as hot blocks upon a first plurality of occurrences of control through each of the blocks reaching a start-instruction frequency threshold;

(2) translating and instrumenting the hot blocks to record occurrences of control flow through them; and (3) selecting at least one hot trace, if present, comprising:
  (a) a first hot block of the plurality of hot blocks upon a second plurality of occurrences of control through the first block reaching a start-trace threshold, and
  (b) at least a second hot block related to the first hot block upon a third plurality of occurrences of control through the second hot block reaching a trace-inclusion threshold.

67. The storage media of claim 66, further comprising the steps of:

(4) dynamically translating at least a first hot trace of the at least one hot trace; and (5) dynamically optimizing the translated first hot trace.

68. A computer program product for use with an appropriate computing system having at least one central processing unit (CPU) and at least one memory unit having stored therein a plurality of original instructions of an executable file, the computer program product comprising a computer usable medium having embodied therein computer readable program code method steps, the method steps comprising:

(1) identifying a plurality of blocks of the plurality of original instructions as hot blocks upon a first plurality of occurrences of control through each of the blocks reaching a start-instruction frequency threshold;

(2) translating and instrumenting the hot blocks to record occurrences of control flow through them; and (3) selecting at least one hot trace, if present, comprising:
  (a) a first hot block of the plurality of hot blocks upon a second plurality of occurrences of control through the first block reaching a start-trace threshold, and
  (b) at least a second hot block related to the first hot block upon a third plurality of occurrences of control through the second hot block reaching a trace-inclusion threshold.

69. The computer program product of claim 68, wherein the method steps further comprise:

(4) dynamically translating at least a first hot trace of the at least one hot trace; and (5) dynamically optimizing the translated first hot trace.

* * * * *

UNITED STATES PATENT AND TRADEMARK OFFICE
CERTIFICATE OF CORRECTION

PATENT NO. : 6,189,141 B1
DATED : February 13, 2001
INVENTOR(S) : Manuel E. Benitez et al.

It is certified that error appears in the above-identified patent and that said Letters Patent is hereby corrected as shown below:

Column 41,
Line 39, delete "hot locks" and insert therefor -- hot blocks --

Signed and Sealed this

Twenty-fifth Day of May, 2004

JON W. DUDAS
*Acting Director of the United States Patent and Trademark Office*